(12) United States Patent
Yang

(10) Patent No.: US 11,704,553 B2
(45) Date of Patent: Jul. 18, 2023

(54) NEURAL NETWORK SYSTEM FOR SINGLE PROCESSING COMMON OPERATION GROUP OF NEURAL NETWORK MODELS, APPLICATION PROCESSOR INCLUDING THE SAME, AND OPERATION METHOD OF NEURAL NETWORK SYSTEM

(71) Applicant: Samsung Electronics Co., Ltd., Suwon-si (KR)

(72) Inventor: Seung-soo Yang, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1254 days.

(21) Appl. No.: 16/189,206

(22) Filed: Nov. 13, 2018

(65) Prior Publication Data

US 2019/0147337 A1 May 16, 2019

(30) Foreign Application Priority Data

Nov. 15, 2017 (KR) .................. 10-2017-0152508

(51) Int. Cl.
*G06N 3/08* (2023.01)
*G06N 3/045* (2023.01)

(52) U.S. Cl.
CPC ............... *G06N 3/08* (2013.01); *G06N 3/045* (2023.01)

(58) Field of Classification Search
CPC ...... G06N 3/08; G06N 3/0454; G06N 3/0445; G06N 3/0472; G06N 3/063
See application file for complete search history.

(56) References Cited

U.S. PATENT DOCUMENTS

| 5,295,227 | A | * | 3/1994 | Yokono ................ G06K 9/62 706/28 |
| 6,968,335 | B2 | * | 11/2005 | Bayliss ............. G06F 16/2471 |
| 7,127,083 | B2 | | 10/2006 | Han et al. |
| 7,418,123 | B2 | | 8/2008 | Giger et al. |
| 7,689,016 | B2 | | 3/2010 | Stoecker et al. |
| 8,006,220 | B2 | | 8/2011 | McConaghy et al. |
| 8,984,515 | B2 | * | 3/2015 | Gupta ...................... G06F 9/50 707/720 |
| 9,275,308 | B2 | | 3/2016 | Szegedy et al. |
| 9,477,753 | B2 | | 10/2016 | Kingsbury et al. |

(Continued)

FOREIGN PATENT DOCUMENTS

| CN | 108780406 B | * | 12/2021 | .......... G06F 12/023 |
| JP | 2012-160014 A | | 8/2012 | |

(Continued)

OTHER PUBLICATIONS

Miranda et al., "Reducing the Training Time of Neural Networks by Partitioning", ICLR 2016 (Year: 2016).*

*Primary Examiner* — Alexey Shmatov
*Assistant Examiner* — Beatriz Ramirez Bravo
(74) *Attorney, Agent, or Firm* — Harness, Dickey & Pierce, P.L.C.

(57) ABSTRACT

A method of operating a neural network system includes merging, by a processor, a first operation group in a first neural network and a second operation group in a second neural network, including identical operations, as a shared operation group; selecting, by the processor, a first hardware to execute the shared operation group, from among a plurality of hardware; and executing the shared operation group by using the first hardware.

17 Claims, 23 Drawing Sheets

(56) References Cited

U.S. PATENT DOCUMENTS

| | | |
|---|---|---|
| 9,508,347 B2 | 11/2016 | Wang et al. |
| 9,514,366 B2 | 12/2016 | Schweid et al. |
| 9,514,404 B1 | 12/2016 | Corrado et al. |
| 9,536,293 B2 | 1/2017 | Lin et al. |
| 9,558,748 B2 | 1/2017 | Lane et al. |
| 9,607,355 B2 | 3/2017 | Zou et al. |
| 9,665,823 B2 | 5/2017 | Saon et al. |
| 11,087,206 B2* | 8/2021 | Schwartz ............. G06N 3/0445 |
| 11,269,643 B2* | 3/2022 | Ma ........................ G06F 9/3832 |
| 2015/0324690 A1* | 11/2015 | Chilimbi ................ G06N 3/063 |
| | | 706/27 |
| 2017/0124415 A1 | 5/2017 | Choi et al. |
| 2017/0161603 A1 | 6/2017 | Okanohara et al. |
| 2018/0314524 A1* | 11/2018 | Keskin .................. G06F 9/3848 |
| 2019/0065944 A1* | 2/2019 | Hotson .................. G06N 3/084 |
| 2020/0412799 A1* | 12/2020 | Lee ....................... G06F 9/5044 |

FOREIGN PATENT DOCUMENTS

| | | |
|---|---|---|
| JP | 2013-171327 A | 9/2013 |
| JP | 2017-111660 A | 6/2017 |

* cited by examiner

NEURAL NETWORK SYSTEM FOR SINGLE PROCESSING COMMON OPERATION GROUP OF NEURAL NETWORK MODELS, APPLICATION PROCESSOR INCLUDING THE SAME, AND OPERATION METHOD OF NEURAL NETWORK SYSTEM

CROSS-REFERENCE TO RELATED APPLICATION

This application claims the benefit of Korean Patent Application No. 10-2017-0152508, filed on Nov. 15, 2017, in the Korean Intellectual Property Office, the disclosure of which is incorporated herein in its entirety by reference.

BACKGROUND

1. Field

At least some example embodiments of the inventive concepts relate to a neural network, and more particularly, to a neural network system for performing single processing on a shared operation group of neural network models, an application processor including the same, and a method of operating the neural network system.

2. Related Art

A neural network refers to a computational architecture which is made by modeling a biological brain. According to development of a neural network technology, research analyzing input data and obtaining effective information by using neural network devices in various kinds of electronic systems has been actively made. A plurality of neural networks used for obtaining different information may include a common operation group or a common neural network model.

SUMMARY

According to at least some example embodiments of the inventive concepts, a method of operating a neural network system includes merging, by a processor, a first operation group in a first neural network and a second operation group in a second neural network, including identical operations, as a shared operation group; selecting, by the processor, a first hardware to execute the shared operation group, from among a plurality of hardware; and executing the shared operation group by using the first hardware.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Figure 1:
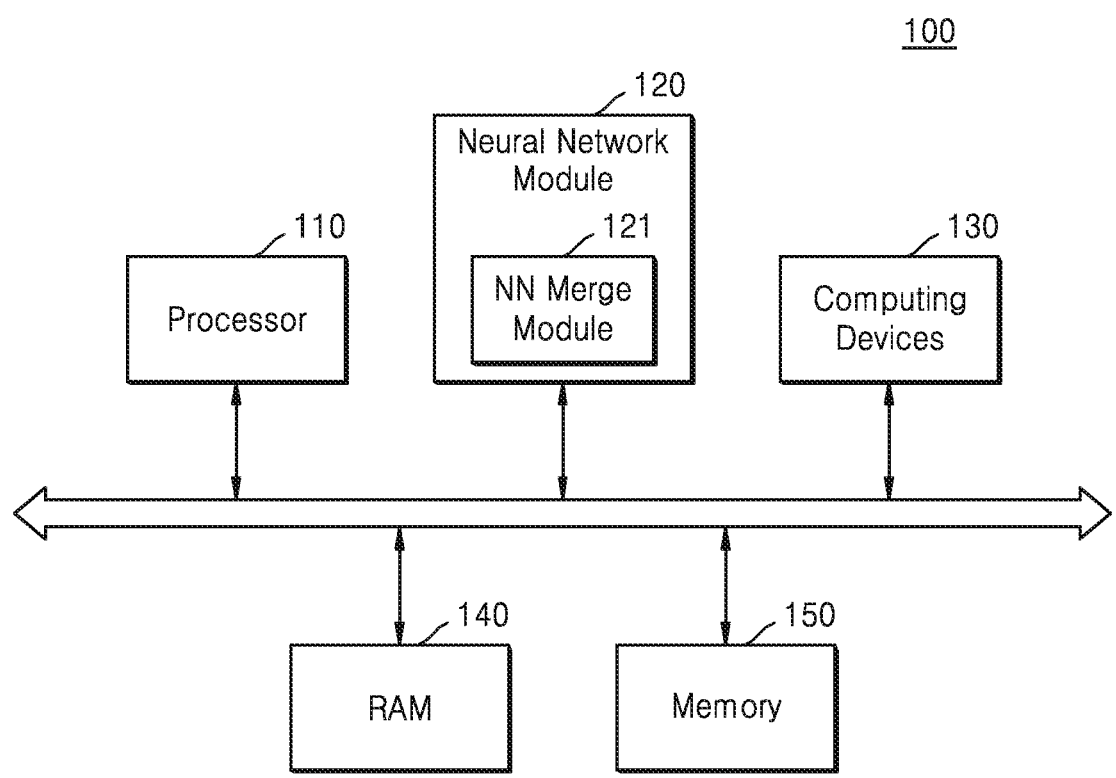
FIG. 1 is a block diagram showing an electronic system according to at least one example embodiment of the inventive concepts.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

FIG. 1 is a block diagram showing an electronic system 100 according to at least one example embodiment of the inventive concepts.

The electronic system 100 of FIG. 1 may obtain effective information by analyzing input data in real time based on a neural network, and may estimate situations based on the obtained information, or control components of electric devices included in the electronic system 100.

The electronic system 100 in FIG. 1 may be an application processor (AP) used for mobile devices. The electronic system 100 in FIG. 1 may correspond to a computing system, or to a drone, an automated system such as an advanced driver-assistance system (ADAS), a robot device, a smart TV, a smart phone, a medical device, a mobile device, an image display device, a measuring instrument, and an Internet of Things (IoT) device, and the like. Hereinafter, it is assumed that the electronic system 100 in FIG. 1 corresponds to the AP.

Referring to FIG. 1, the electronic system 100 may include a processor 110, a neural network module 120, computing devices 130, a random access memory (RAM) 140, and a memory 150, and the neural network module 120 may include a neural network merge module (121). According to at least one example embodiment of the inventive concepts, at least some of components of the electronic system 100 may be mounted on a single semiconductor chip.

In a sense that the electronic system 100 performs a neural network computing function, the electronic system 100 may be defined as including a neural network system. In relation with neural network operations, the neural network system may include at least some of the components included in the electronic system 100. For example, the neural network system may include the processor 110, the neural network module 120, and the computing devices 130, but not limited thereto. For example, the neural network system may include various different kinds of components relevant to the neural network operations.

The processor 110 controls overall operations of the electronic system 100. The processor 110 may be or include, for example, a single-core processor, a multi-core processor, or multiprocessor. The processor 110 may process or execute programs and/or data stored in the memory 150. According to at least one example embodiment of the inventive concepts, the processor 110 may control functions of the neural network module 120 and the computing devices 130, by executing the programs stored in the memory 150.

The RAM 140 may temporarily store programs, data, or instructions. For example, the programs and/or the data stored in the memory 150 may be temporarily stored in the RAM 140, according to control of the processor 110 or booting codes. The RAM 140 may be implemented as memories like dynamic RAM (DRAM) or static RAM (SRAM), and so on.

The memory 150 may store control instruction codes, control data to control the electronic system, or user data. The memory 150 may include at least one of a volatile memory and a nonvolatile memory. For example, the memory 150 may be implemented by DRAM, SRAM, embedded RAM, or the like.

The neural network module 120 may perform neural network-based tasks, based on, or, alternatively, using, one or more neural networks of various kinds. According to at least some example embodiments of the inventive concepts, or more operations associated with or, alternatively, required for the performance of a task by a neural network may be executed by the computing devices 130. The neural network module 120 may generate data signals as results from the performances. The data signals may include one of various recognition signals such as voice recognition signals, object recognition signals, image recognition signals, biometrics recognition signals.

According to at least some example embodiments of the inventive concepts, neural networks used to perform tasks by the neural network module may include various kinds of neural network models examples of which include, but not limited to, convolution neural networks (CNN) (e.g., GoogLeNet, AlexNet, VGG Network, or region with convolution neural network (R-CNN)), region proposal networks (RPN), recurrent neural networks (RNN), stacking-based deep neural networks (S-DNN), state-space dynamic neural networks (S-SDNN), deconvolution networks, deep belief networks (DBN), restricted Boltzmann machines (RBM), fully convolutional networks, long short-term memory (LSTM) networks, and classification networks. Also, a neural network performing a task may include sub-neural networks, which may be implemented as different kinds of neural network models.

The electronic system 100 may execute various kinds of applications, and the applications may request performance of the neural network-based tasks of the same kind or different kinds to the neural network module 120. When the different neural networks requested to perform the tasks include an identical sub-neural network (that is, an identical neural network model) or an identical operation group, the neural network module 120 may set the identical sub neural network or the identical operation group to be solely computed in the identical computing device in the process of executing the different neural networks. The neural network module 120 may include a neural network merge module 121. The term "operation group," as used in the present disclosure, refers to a group of operations. Further, the act of performing or executing (e.g., an operation or operations), may also be referred to as "computing" (e.g., "computing the operation," " . . . computes the operation," "the operation is computed by . . . ," " . . . may compute the operation," etc. are various ways of describing performance or execution of an operation in the present disclosure).

The neural network merge module 121 may search for operation groups (which will be referred to as common operation groups) or sub neural networks (which will be referred to as common sub neural network or common neural network models) included in common in a plurality of neural networks processing various tasks, and merge the common operation groups or the common neural network models, based on information regarding the plurality of neural networks processing different tasks, that is, neural network model information. The merged common operation groups and the merged neural network models may respectively be referred to as a merged operation group (or a shared operation group) and a merged neural network model (or a shared neural network model).

The neural network merge module 121 may select a computing resource, that is, a computing device in which the merged operation group or the merged neural network module is computed, in consideration of processing resources and preferred information of the applications (e.g., information indicating preferences of the applications) being executed by the electronic system 100, for example, task execution policies.

The neural network merge module 121 may be implemented in various forms, and according to at least one example embodiment of the inventive concepts, may be implemented in the form of software (i.e., software executed by a processor). However, the implementation of the neural network merge module 121 is not limited thereto, and the neural network merge module 121 may be implemented in the form of hardware, or in the form of a combination of hardware and software. According to at least one example embodiment of the inventive concepts, the neural network merge module 121 may be implemented in the form of software in an operation system OS or a lower stage of the same, and may also be implemented as programs that may be loaded in the memory 150.

For example, according to at least some example embodiments of the inventive concepts, the neural network module 120 may include or be implemented by one or more circuits or circuitry (e.g., hardware) specifically structured to carry out and/or control some or all of the operations described in the present disclosure as being performed by the neural network module 120 (or an element thereof, e.g., the neural network merge module 121). According to at least one example embodiment of the inventive concepts, the neural network module 120 may include or be implemented by a memory (e.g., RAM 140 and/or memory 150) and one or more processors (e.g., the processor 110) executing computer-executable code (e.g., software and/or firmware) that is stored in the memory and includes instructions for causing the one or more processors to carry out and/or control some or all of the operations described in the present disclosure as being performed by the neural network module 120 (or an element thereof, e.g., the neural network merge module 121). According to at least one example embodiment of the inventive concepts, the neural network module 120 may be implemented by, for example, a combination of the above-referenced hardware and one or more processors executing computer-executable code.

Under control of the neural network module 120, the computing devices 130 may compute operations with respect to the received input data. The computing devices 130 may include processors. For example, according to at least some example embodiments of the inventive concepts, the computing devices 130 may each be or include a central processing unit (CPU), graphic processing unit (GPU), neural processing unit (NPU), digital signal processor (DSP), field programmable gate array (FPGA), or electronic control unit (ECU). Also, the computing devices 130 may include a separate memory (not shown) for storing results from the operation. One of a plurality of hardware devices included in the computing devices 130 may compute the merged operation group.

Hereinafter, neural network merge operation of the neural network merge module 121 will be described in more detail with reference to FIG. 2.

Figure 2:
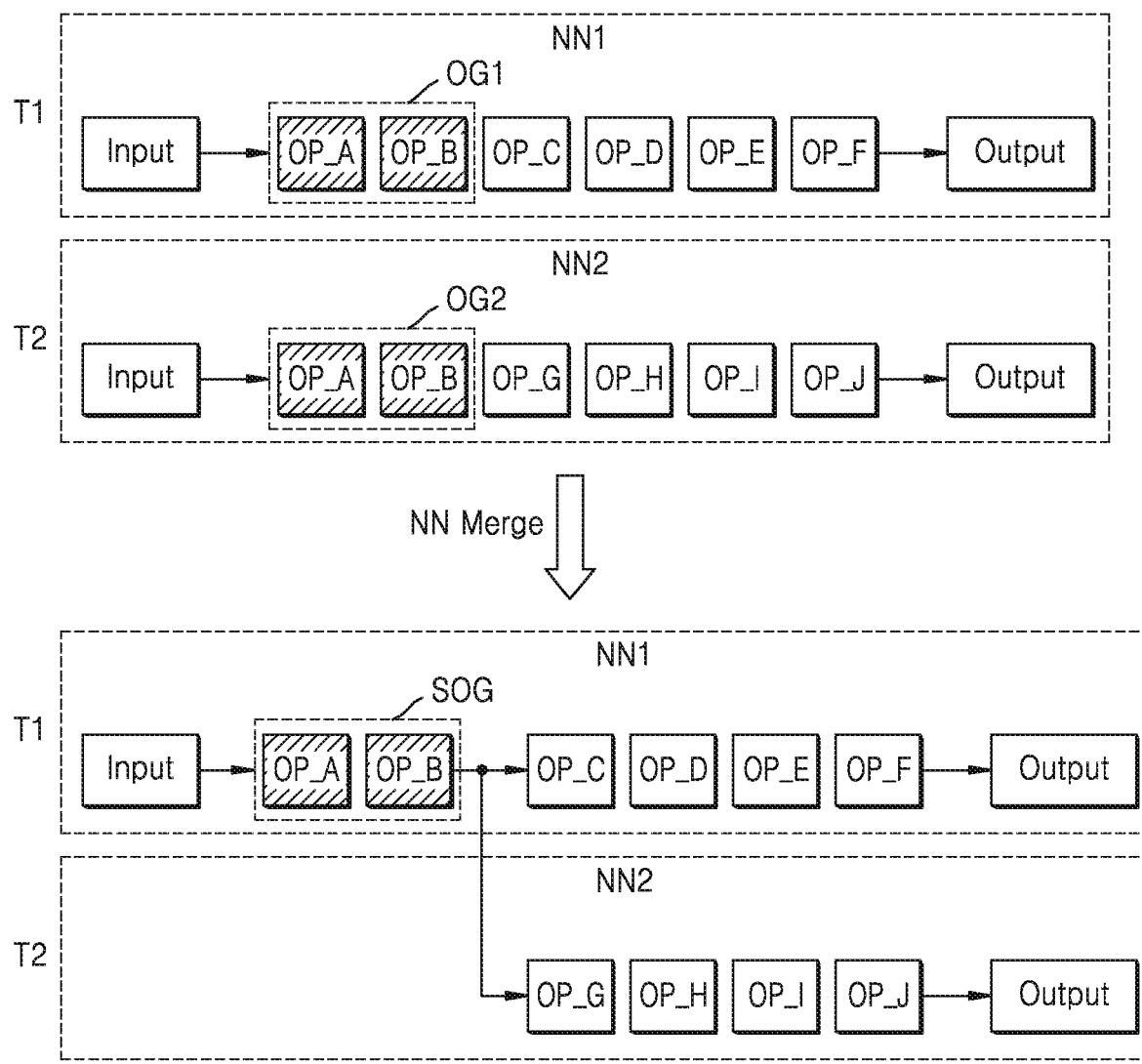
FIG. 2 is a diagram for describing an operational concept of a neural network merge module according to at least one example embodiment of the inventive concepts.

FIG. 2 is a diagram for describing an operation concept of the neural network merge module according to at least one example embodiment.

A neural network may include a plurality of layers (e.g., an input layer, an output layer, and hidden layers), and an operation of a neural network denotes an operation performed on each of a plurality of layers. For example, the operation of a neural network may include a convolution operation, a pulling operation, an active function operation, a dot product operation, a vector operation, and the like.

Referring to FIG. 2, a first task T1 may be performed in a first neural network NN1, and a second task T2 may be performed in a second neural network NN2. The first task T1 and the second task T2 may be requested from a same application or different applications.

For example, the first neural network NN1 may include operations OP_A, OP_B, OP_C, OP_D, OP_E, and OP_F which are sequentially computed. In the first neural network NN1, the operations OP_A, OP_B, OP_C, OP_D, OP_E, and OP_E are computed based on an input, and thus, an output of the first task T1 may be produced.

For example, the second neural network NN2 may include operations OP_A, OP_B, OP_G, OP_H, OP_I, and OP_J which are sequentially computed. In the second neural network NN2, the operations OP_A, OP_B, OP_G, OP_H, OP_I, and OP_J are computed based on an input, and thus, an output of the second task T2 may be produced.

Both of the first neural network NN1 and the second neural network NN2 include the operations OP_A and OP_B, and computing orders of the operations OP_A and OP_B are the same in the first and second neural networks NN1 and NN2. The operations OP_A and OP_B in the first neural network NN1 are referred to as a first operation group OP1, and the operations OP_A and OP_B in the second neural network NN2 are referred to as a second operation group OP2. When the first task T1 and the second task T2 have identical inputs, the first operation group OG1 and the second operation group OG2 may have identical outputs.

The neural network merge module 121 (see FIG. 1) may merge the first operation group OG1 and the second operation group OG2 into one operation group, that is, a shared operation group SOG, and may set an output from the shared operation group SOG to be input to following operations (for example, the operations OP_C and OP_G). Accordingly, in computing processes of the first neural network NN1 and the second neural network NN2, the shared operation group SOG may be computed once.

In the computing processes of the first neural network NN1 and the second neural network NN2, when the first operation group OG1 and the second operation group OG2 are separately computed, for example, when the operation groups OG1 and OG2 are computed in two different computing devices or computed twice in one same computing device, the operations are redundantly computed, and thus, memory use, power consumption, and time consumption for computing the operations are redundantly caused.

However, as described above, according to a method of merging the operation groups, which is a method of operating the neural network merge module 121 according to at least one example embodiment of the inventive concepts, in the execution process of the first neural network NN1 and the second neural network NN2, the first operation group OG1 and the second operation group OG2 are not computed separately, and the shared operation group SOG is computed once. Accordingly, redundant execution of the operations, and memory use, power consumption, and time consumption for computing the operations may be reduced. Accordingly, function of the electronic system 100 (see FIG. 1) or the neural network system NNS (see FIG. 1) may be improved.

Figure 3:
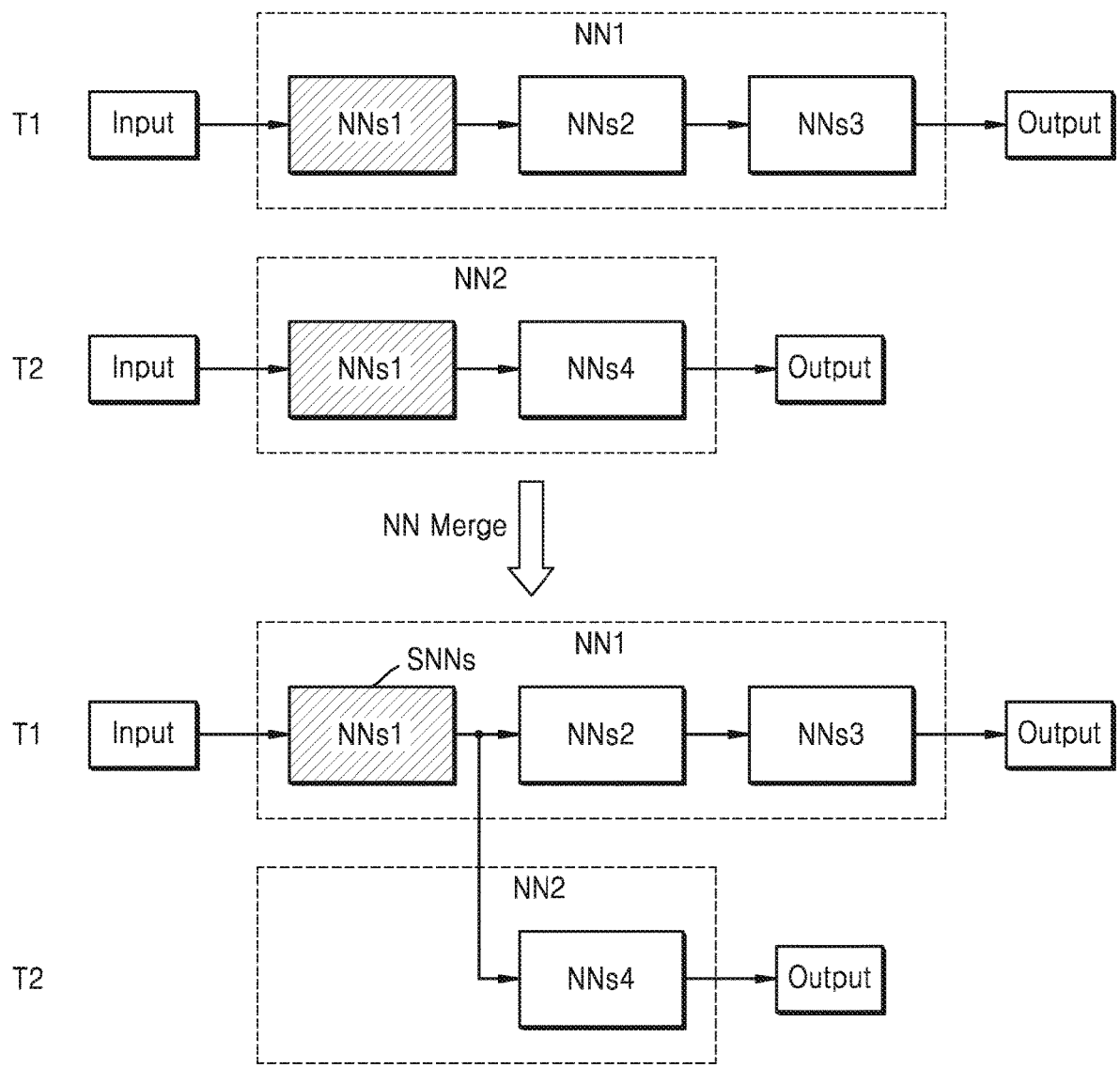
FIG. 3 is a diagram for describing an operation concept of the neural network merge module according to at least one example embodiment of the inventive concepts.

FIG. 3 is a diagram for describing an operation concept of the neural network merge module according to at least one example embodiment of the inventive concepts.

The neural network may include a plurality of sub neural networks, and when the plurality of neural networks include identical sub neural networks (that is, identical neural network models), the neural network module 121 (see FIG. 1) may merge identical sub neural networks among the plurality of sub neural networks included in each of the plurality of neural networks.

Referring to FIG. 3, the first task T1 may be performed in the first neural network NN1, and the second task T2 may be performed in the second neural network NN2. For example, the first neural network NN1 may include sub neural networks NNs1, NNs2, NNs3 which are sequentially executed, and the second neural network NN2 may include sub neural networks NNs1 and NNs4 which are sequentially executed.

Both of the first neural network NN1 and the second neural network NN2 include the sub neural network NNs1. The neural network merge module 121 may merge the sub neural networks NNs1s included in the first neural network NN1 and the second neural network NN2 into one sub neural network, for example, a shared sub neural network SNNs, and may set an output from the shared sub neural network SNNs to be input to subsequent sub neural networks (for example, sub neural networks NNs2 and NNs4). Accordingly, in the computing process of the first neural network NN1 and the second neural network NN2, the shared sub neural network SNNs may be solely executed.

Figure 4:
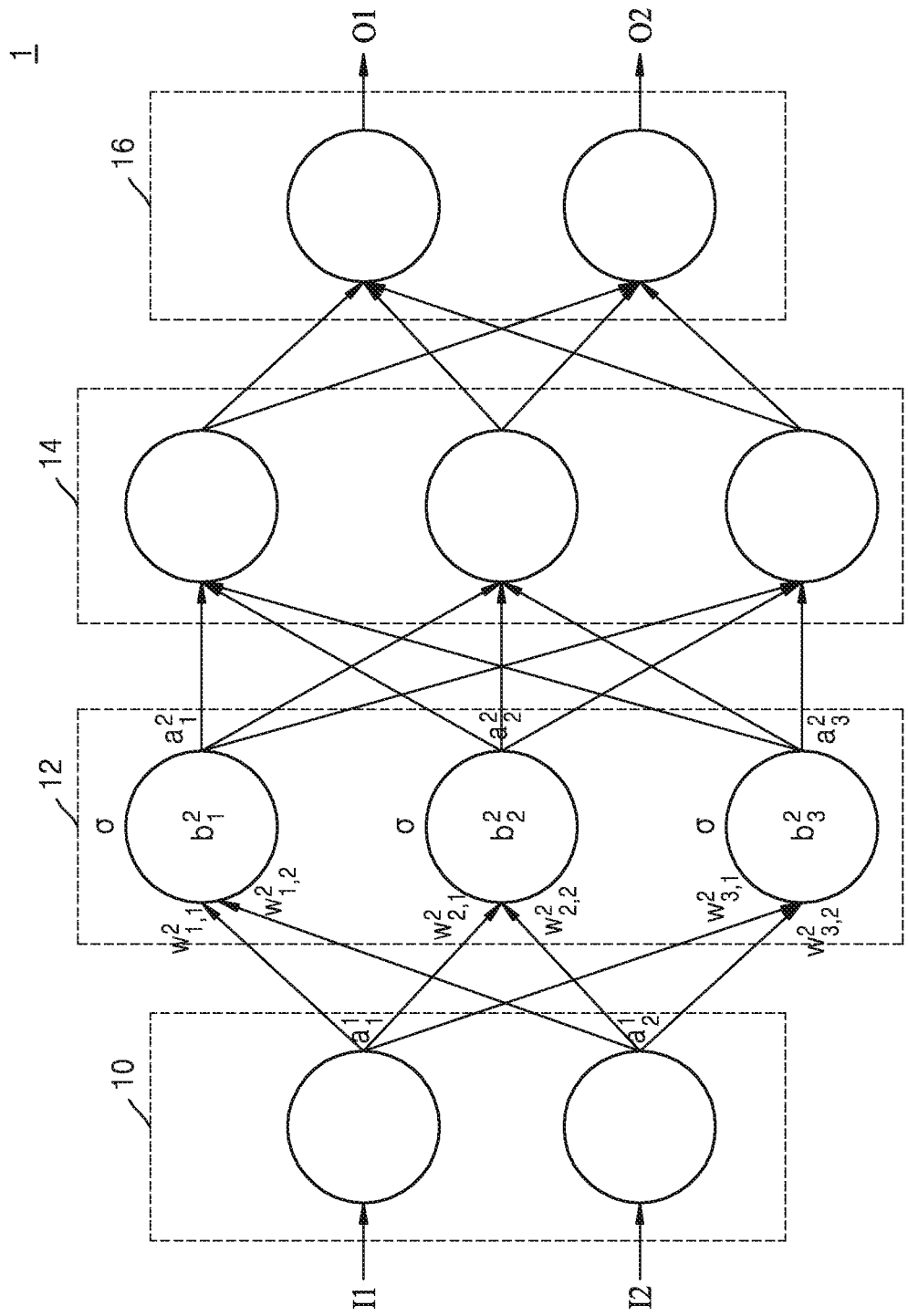
FIG. 4 shows an example of a neural network applied to a neural network system according to at least one example embodiment of the inventive concepts.

FIG. 4 shows an example of a neural network applied to the neural network system according to at least one example embodiment of the inventive concepts.

Referring to FIG. 4, the neural network 1 may have a structure including an input layer, hidden layers, and an output layer. The neural network 1 may perform operations based on input data (for example, I1 and I2), and may generate output data (for example, O1 and O2), based on results of the performance.

The neural network 1 may be a deep neural network DNN or an n-layer neural network including at least two hidden layers. For example, as illustrated in FIG. 1, the neural network 1 may be the DNN including an input layer 10, first and second hidden layers 12 and 14, and the output layer 16.

As the neural network 1 having the DNN structure includes more layers to obtain available information, the neural network 1 may process complex data sets. Although the neural network 1 is illustrated as including four layers 10, 12, 14, and 16, it is merely an example, and the neural network 1 may include less or more layers. The neural network 1 may also include layers having various structures different from those illustrated in FIG. 4.

Each of the layers 10, 12, 14, and 16 included in the neural network 1 may include a plurality of neurons. The neurons may correspond to a plurality of artificial nodes which are known as process elements (PE), unit, or other similar terms. For example, as illustrated in FIG. 4, the input layer 10 may include two neurons (nodes), and each of the first and second hidden layers 12 and 14 may include three neurons (nodes). However, it is merely an example, and each of the layers included in the neural network 1 may include various numbers of neurons (nodes).

The neurons in each of the layers included in the neural networks 1 may be connected and exchange data. One of the neurons may receive data from other neurons and perform operation, and may output operation results to the other neurons.

An input and an output of each of the neurons (nodes) may be referred to as input activation and output activation. In other words, activation may be a parameter corresponding to an output from a neuron and an input of the neurons included in following layers. Also, each of the neurons, based on the activations (for example, $a_1^1$, $a_1^2$ and the like), weights (for example, $w_{1,1}^2$, $w_{1,2}^2$, $w_{2,1}^2$, $w_{2,2}^2$, $w_{3,1}^2$, $w_{3,3}^2$ and the like), and bias (for example, $b_1^2$, $b_2^2$, $b_3^2$, and the like) received from neurons included in former layers, may determine its activations. The weight and bias are parameters used to calculate output activations from the neurons, the weight is a value assigned to connections between the neurons, and the bias is a loading factor relevant to each of the neurons.

In order that the neurons may determine the activations, in other words, in order to determine the outputs of the layers, the layers 10, 12, 14, and 16 may include at least one operation. The neural network 1 having a multi-layer structure may include a plurality of operations, and may require a large amount of computation to process input data and generate output data.

Figure 5:
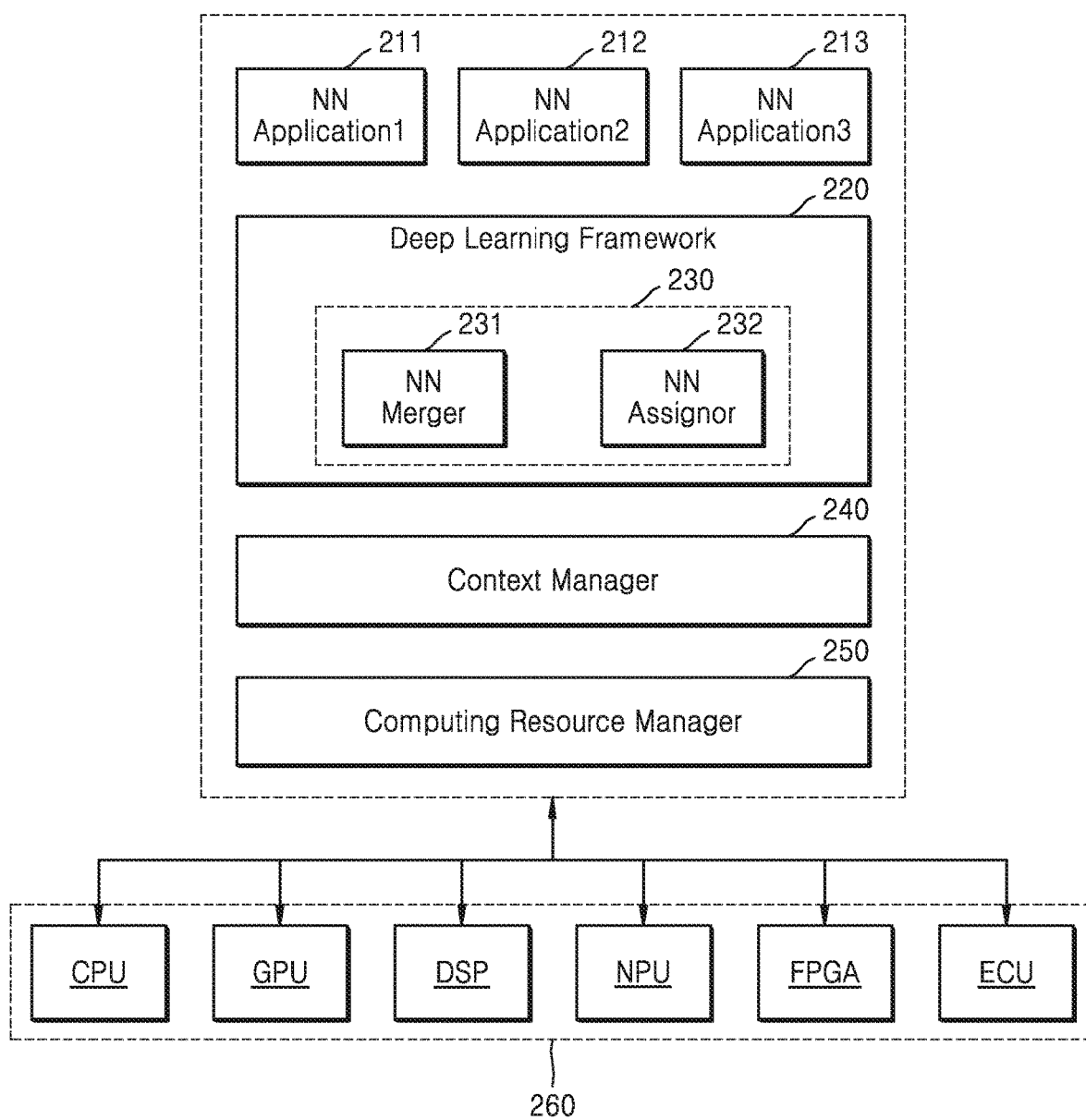
FIG. 5 is a block diagram showing a neural network system according to at least one example embodiment of the inventive concepts.

FIG. 5 is a block diagram showing a neural network system according to at least one example embodiment of the inventive concepts.

Referring to FIG. 5, the neural network system 200 may include a plurality of neural network-based applications 211, 212, and 213, a deep learning framework 220, a context manager 240, a computing resource manager 250, and computing devices 260. The applications 211, 212, and 213, the deep learning framework 220, the context manager 240, and the computing resource manager 250 may be implemented as software. However, the aforementioned components are not limited thereto, According to at least one example embodiment of the inventive concepts, the aforementioned components of the neural network system 200 may be implemented as combinations of software and hardware.

For example, according to at least some example embodiments of the inventive concepts, the neural network system 200 may include or be implemented by one or more circuits or circuitry (e.g., hardware) specifically structured to carry out and/or control some or all of the operations described in the present disclosure as being performed by the neural network system 200 (or an element thereof). According to at least one example embodiment of the inventive concepts, the neural network system 200 may include or be implemented by a memory and one or more processors executing computer-executable code (e.g., software and/or firmware) that is stored in the memory and includes instructions for causing the one or more processors to carry out and/or control some or all of the operations described in the present disclosure as being performed by the neural network system 200 (or an element thereof). According to at least one example embodiment of the inventive concepts, the neural network system 200 may be implemented by, for example, a combination of the above-referenced hardware and one or more processors executing computer-executable code.

The computing devices 260 may include a plurality of processors, that is, a plurality of hardware devices. Although the computing devices 260 are illustrated as including CPU, GPU, DSP, NPU, FPGA, and ECU, it is merely for illustrative descriptions, and the computing devices 260 are not limited thereto. The computing devices 260 may further include other processors, and may include at least one processor from among CPU, GPU, DSP, NPU, FPGA, and ECU.

Each of the plurality of applications 211, 212, and 213 may request performance of the neural network-based tasks. For example, when the first application 211 provides an autonomous driving function of a vehicle, the first application 211 may issue tasks such as object detection, scene division, with respect to images of at least one frame. For another example, when the second application 212 provides a voice recognition function, the second application 212 may issue tasks such as speaker recognition, voice-text conversion, with respect to voice signals. Besides the aforementioned tasks, the plurality of applications 211, 212, and 213 may issue various tasks.

As a neural network module based on a deep neural network, the deep learning framework 220 provides a plurality of neural networks including a deep learning algorithm, and provides an interface between the plurality of applications 211, 212, and 213 and the computing devices 260 so that the operations of each of the neural networks to perform the tasks issued by the plurality of applications may be performed in the computing devices 260. The deep learning framework 220 may control overall executions of the plurality of neural networks.

For example, based on the static information and the dynamic information, the deep learning framework 220, may assign a computing resource to the operations of the plurality of neural networks in which the tasks issued by executed applications from among the plurality of applications 211, 212, and 213 are to be performed. Each of the static information and the dynamic information may include various kinds of information. For example, the static information may include basic information about various components in the electronic system 100 (see FIG. 1), and for example, may include computing resource information such as capacity and characteristics of processors (hardware devices) included in the computing devices (130 in FIGS. 1 and 260 see FIG. 5)). The dynamic information includes various information that may be generated while executing the neural network module, for example, computing context information in a runtime process.

The deep learning framework 220 includes the neural network merge module 230, and may provide the information regarding the plurality of neural networks, namely, neural network model information, to the neural network merge module 230. The neural network model information may include various information such as neural network IDs of the sub neural networks, IDs of the operation groups (for example, class ID, workspace ID, subgroup ID) included in the neural network (or each of the sub neural networks), layer topologies such as depths and branches of the neural network (or each of the sub neural networks), information regarding compression methods, information regarding operation on respective layers (for example, information regarding data characteristics such as the sizes of inputs and outputs, kernel/filter, weight, format, security, padding, stride), and methods of compressing data.

The neural network merge module 230 may include a neural network merger 231 and a neural network assignor 232. The neural network merger 231 may search for operation groups included in common (common operation groups) or sub neural networks included in common (common sub neural networks) in the neural networks performing different tasks, and may merge the common operation groups or the common sub neural networks included in the neural networks.

The neural network assignor 232 may assign computing resources to the merged operation groups. The neural network assignor 232 may assign the computing resource to the merged operation groups, based on preferred information of the applications (e.g., information indicating preferences of the applications), a computing resource state, and the like. The neural network assignor 232, for example, may select one of CPU, GPU, DSP, NPU, FPGA, and ECU included in the computing devices 260 as a hardware device in which the merged operation group is computed. In a process where the neural networks are executed for performance of the tasks issued from the plurality of applications 211, 212, and 213, the merged operation group may be solely processed (computed) in the assigned hardware device.

The context manager 240 may manage the dynamic information generated while executing the neural networks and provide the dynamic information to the deep learning framework 220. During the runtime, various states or information related to the performance of neural network operations may be managed by the context manager. For example, information regarding output accuracy, latency, and frame per second (FPS), and policies of the applications related to task execution, such as preferred information of the plurality of applications, for example, allowable accuracy loss, power setting, required latency, may be provided to the deep learning framework 220 through the context manager 240. Together with the aforementioned dynamic information related to the runtime, various information, such as change in states of the computing resources, power/temperature information, state of a bus/memory/storage, types of the applications and lifecycles of the applications, may be provided to the deep learning framework 220 through the context manager 240, as dynamic information related to the computing resources.

Figure 6:
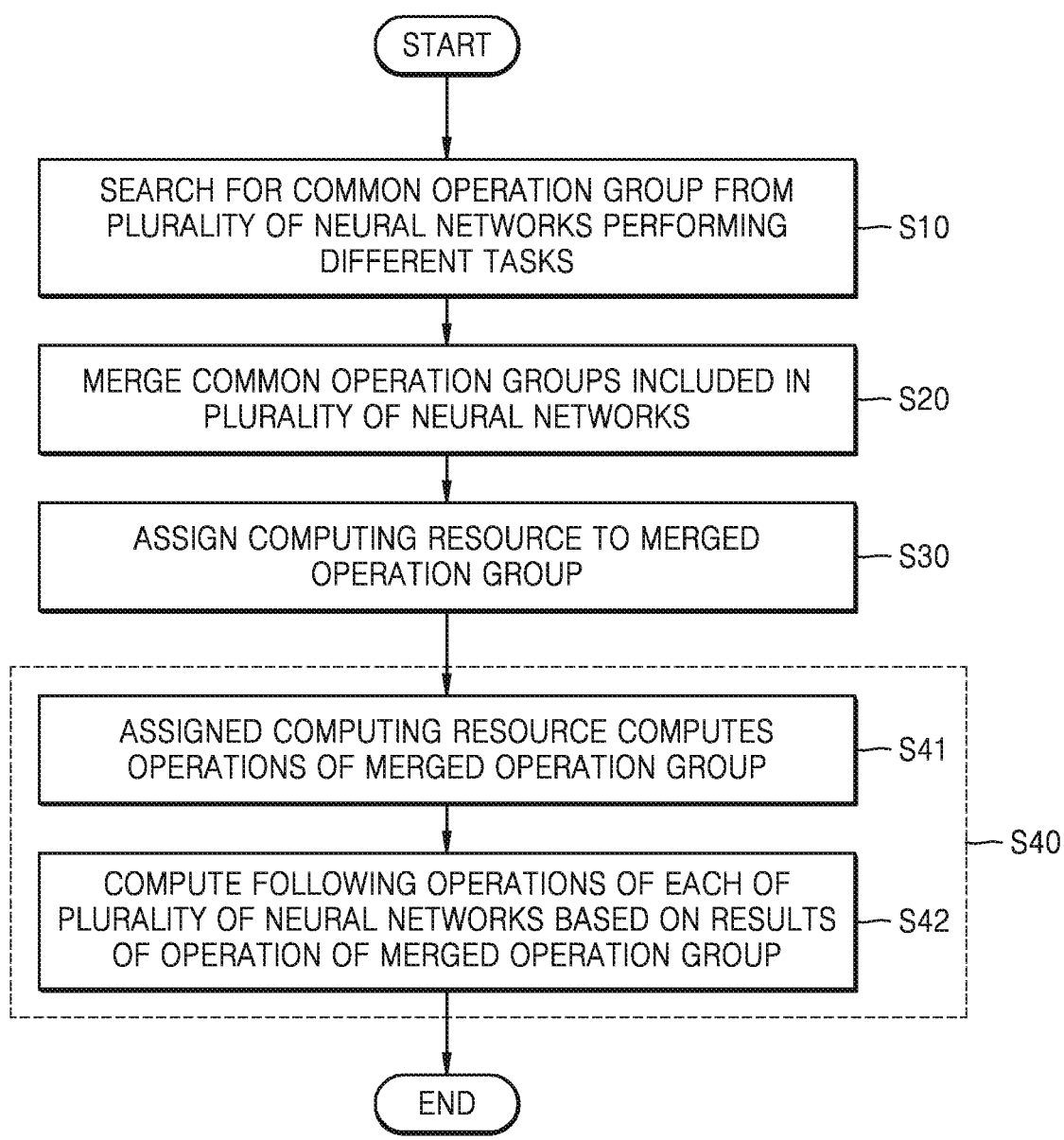
FIG. 6 is a flowchart showing operations of the neural network system according to at least one example embodiment of the inventive concepts.

FIG. 6 is a flowchart showing operations of the neural network system according to at least one example embodiment of the inventive concepts. Among the operations of the neural network system, operations of the neural network merge module and the computing devices in FIG. 5 will be mainly described.

Referring to FIGS. 5 and 6, the neural network merger 231 may search for a shared operation group from the plurality of neural networks to perform different tasks (S10).

According to at least one example embodiment of the inventive concepts, the neural network merger 231 may search for a shared operation group or shared sub neural networks, based on information regarding the neural networks provided from the deep learning framework 220. For example, the neural network merger 231 may compare preset IDs with respect to each of the neural networks (for example, ID with respect to the operation groups, sub neural network IDs, and the like), and may search for the operation groups or the sub neural networks having identical IDs.

According to at least one example embodiment of the inventive concepts, the neural network merger 231 may compare layer topologies (for example, prototxt file, graphical topology, and the like) of the neural networks, and obtain a common operation group including identical operations, in which the operations are computed in identical orders. For example, the neural network merger 231 may analyze a layer topology of at least one of a first neural network and a second neural network, and obtain a first operation group and a second operation group, based on a result from the analyzing.

According to at least one example embodiment of the inventive concepts, the neural network merger 231 may generate an operation history by following the operation process in which the neural networks are executed in the runtime, and may obtain a common operation group based on the operation history. For example, the neural network merger 231 trace the operations that are performed when the neural networks are operating.

The neural network merger 231 may determine the operations having identical topologies and identical operands, for example, the size of inputs and outputs of the operations, operation parameters (for example, bias, weight, and the like), as identical operations. However, the determination is not limited thereto, and According to at least one example embodiment of the inventive concepts, the neural network merger 231, when the operations have identical topologies and different operands, for example, when the inputs and outputs of the operations are different or the operations have similar operation parameters, may determine the operations as identical operations. For example, when the first operations of the first neural network and the second operations of the second neural network have identical operation topologies and identical inputs and outputs but a first bias value related to the first operation is different from a second bias value related to the second operation, based on a similarity between the first bias value and the second bias value, an identity between the first operation and the second operation may be determined. When a gap between the first bias value and the second bias value is less than a certain reference value, may determine that the first bias value is similar to the second bias value and the first operation is identical to the second operation.

The neural network merger 231 may merge the common operation groups included in the plurality of networks (S20). The neural network merger 231, by assigning a shared ID to the common operation groups, may set the common operation groups as shared operation groups (merged operation groups), and may set an output of a last layer of the shared operation groups as a shared buffer (not shown) between the plurality of processors (for example, at least two processors from among CPU, GPU, DSP, NPU, FPGA, and ECU), included in the computing devices. The neural network merger 231 may set a shared count. The shared count, for example, may be the number of the neural networks including the shared operation group.

The neural network merger 231 may also set inputs of the following operations after the shared operation group of the neural networks as the shared buffer. Accordingly, even if the neural networks are executed in different processors, execution results of the shared operation group may be provided as inputs of the following operations.

According to at least one example embodiment of the inventive concepts, the neural network merger 231 may eliminate the shared operation groups except one, among the shared operation groups respectively included in the neural networks. For example, when each of the first neural network and the second neural network includes a shared operation group to which the shared ID is set, the neural network merger 231 may eliminate the shared operation group included in the second neural network, except the shared operation group included in the first neural network.

Next, the neural network assignor 232 may assign the computing resource to the merged operation group, that is, the shared operation group (S30). The neural network assignor 232 may select the computing resource in which the shared operation group will be computed, based on preferred information of the applications (e.g., information indicating preferences of the applications), the state of the computing resource, and may assign a resource ID corresponding to the selected computing resource to the shared operation group.

According to at least one example embodiment of the inventive concepts, the neural network assignor 232 may assign the computing resource, based on the shared count. For example, when the shared count set with respect to the shared operation group is equal to or greater than a certain threshold value, the neural network assignor 232 may assign a resource ID of a dedicated NPU with respect to the shared operation group so that the dedicated NPU may compute the shared operation group.

According to at least one example embodiment of the inventive concepts, the neural network assignor 232 may set a non-preemptive value (or a priority) with respect to the shared operation group. For example, to prevent a processor corresponding to the resource ID assigned to the shared operation group from being preoccupied for execution of other operations, the neural network assignor 232 may set a non-preemptive value with respect to the shared operation group. Accordingly, a processor corresponding to the resource ID assigned to the shared operation group may compute an operation of the shared operation group prior to other operations. For example, the neural network assignor 232 may set a priority with respect to the shared operation group, such that the corresponding processor executes the shared operation group prior to other operations.

Next, in the computing devices 260, based on inputs from each of the plurality of neural networks, operations of the plurality of neural networks may be computed (S40).

The computing resource assigned to the merged operation group may compute the operations in the merged operation group (S41). For example, in the operation of assigning the resources (S30), when the resource ID of the dedicated NPU is assigned to the merged operation group, the dedicated NPU may compute the operations of the merged operation group. Operation results may be output to the shared buffer.

The dedicated NPU or other processors may compute following operations of each of the plurality of neural networks, based on the operation results of the merged operation group (S42). For example, when the common operation groups of the first neural network and the second neural network are merged, the resource ID of the GPU is assigned with respect to following operations of (i.e., operations that follow) the merged operation group in the first neural network, the resource ID of the DSP is assigned with respect to following operations of the merged operation group in the second neural network, the operation results of the merged operation group by the dedicated NPU may be stored in the shared buffer, GPU and DSP may access the shared buffer and receive the operation results of the merged operation group, and based on the received result, may compute the following operations of the first neural network and the following operations of the second neural network.

FIGS. 7A through 7D are diagrams showing the neural network merge and neural network execution according to at least one example embodiment of the inventive concepts.

Figure 7A:
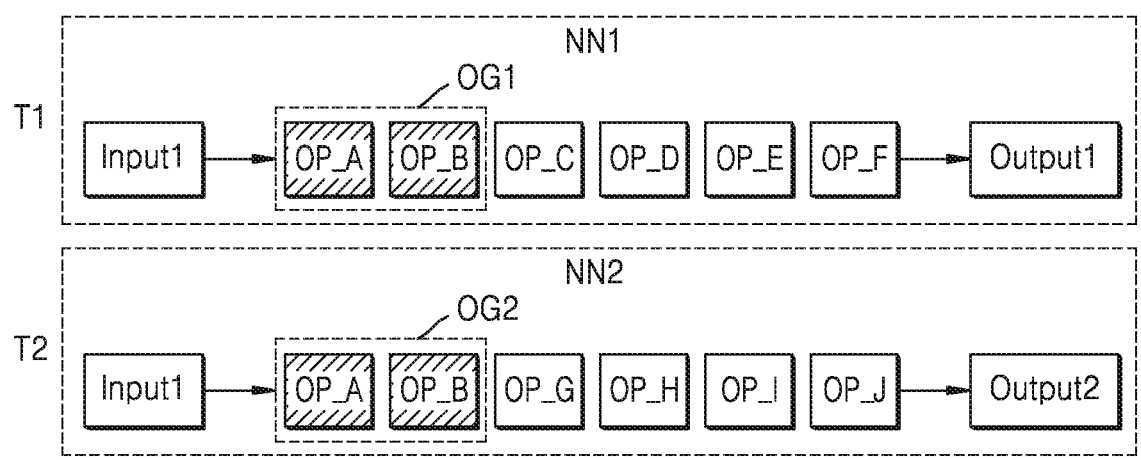
FIGS. 7A through 7D are diagrams showing neural network merge and neural network execution according to at least one example embodiment of the inventive concepts.

Referring to FIG. 7A, a first task T1 may be performed in a first neural network NN1, the second task T2 may be performed in a second neural network NN2, and the first and the second neural networks NN1 and NN2 may have identical inputs. Also, a first operation group OG1 of the first neural network NN1 and the second operation group OG2 of the second neural network NN2 may include same operations OP_A and OP_B.

Figure 7B:
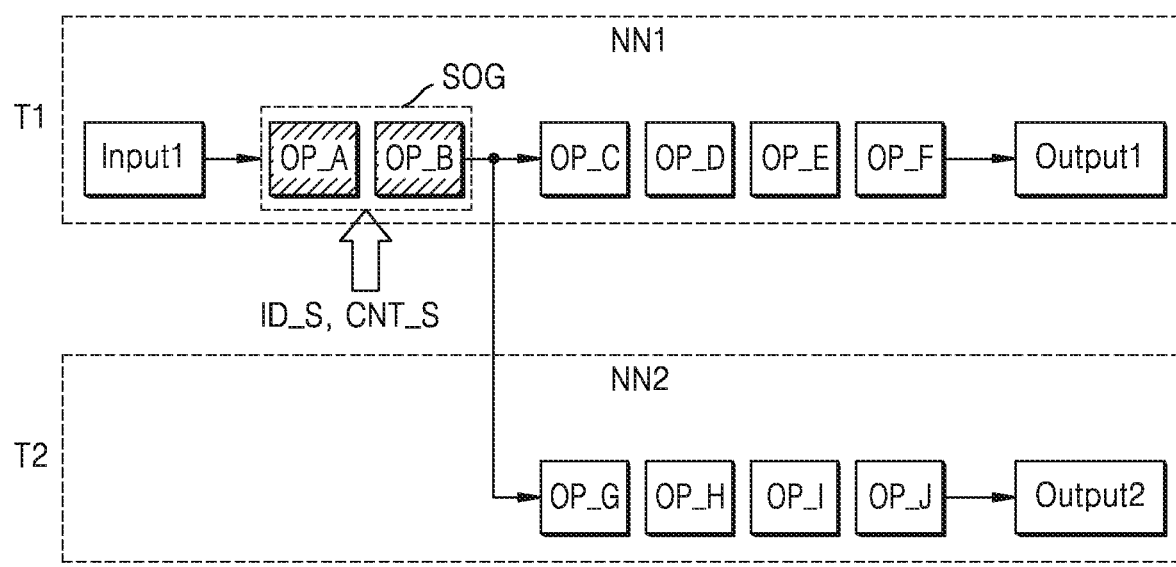

Referring to FIG. 7B, the first operation group OG1 of the first neural network NN1 and the second operation group OG2 of the second neural network NN2 may be merged into a shared operation group SOG. For the first operation group OG1 of the first neural network NN1 and the second operation group OG2 of the second neural network NN2, a shared ID ID_S and a shared count CNT_S may be set. According to at least one example embodiment of the inventive concepts, the shared count CNT_S may be set as '2'. As an output of the shared operation group SOG having the shared ID ID_S is set as a shared buffer of the processors, and as inputs of following operations OP_C and OP_G of the first neural network NN1 and the second neural network NN2 are set as the shared buffers, the output from the shared operation group SOG may be provided to the following operations OP_C and OP_G in the first neural network NN1 and the second neural network NN2. Among the shared operation groups SOGs of the first neural network NN1 and the second neural network NN2, the shared operation groups SOGs except one may be eliminated. For example, as illustrated, the shared operation group SOG of the second neural network NN2 may be eliminated.

Figure 7C:
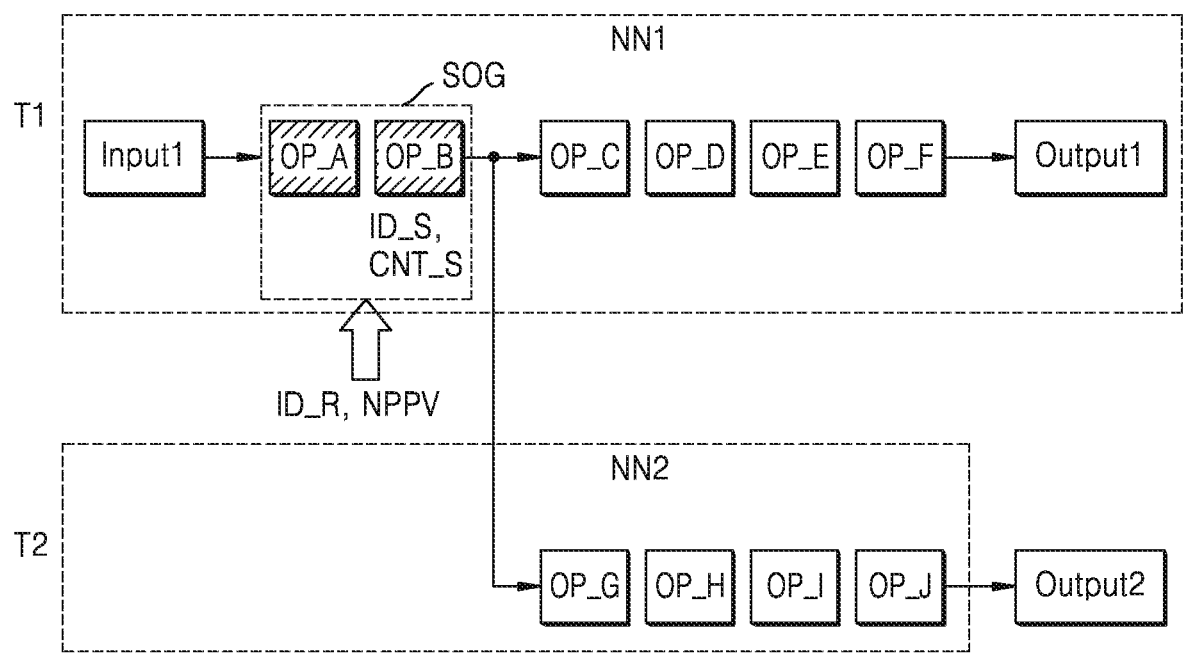

Referring to FIG. 7C, a resource ID ID_R indicating a computing resource to execute the shared operation group SOG may be set for the shared operation group SOG, that is, the merged operation group. According to at least one example embodiment of the inventive concepts, a non-preemptive value NPPV (or a priority) may be additionally set for the shared operation group SOG. Accordingly, a computing resource, for example, a processor, may be assigned to the shared operation group SOG. When the non-preemptive value NPPV is set, the shared operation group SOG may have the priority with respect to the processor.

Figure 7D:
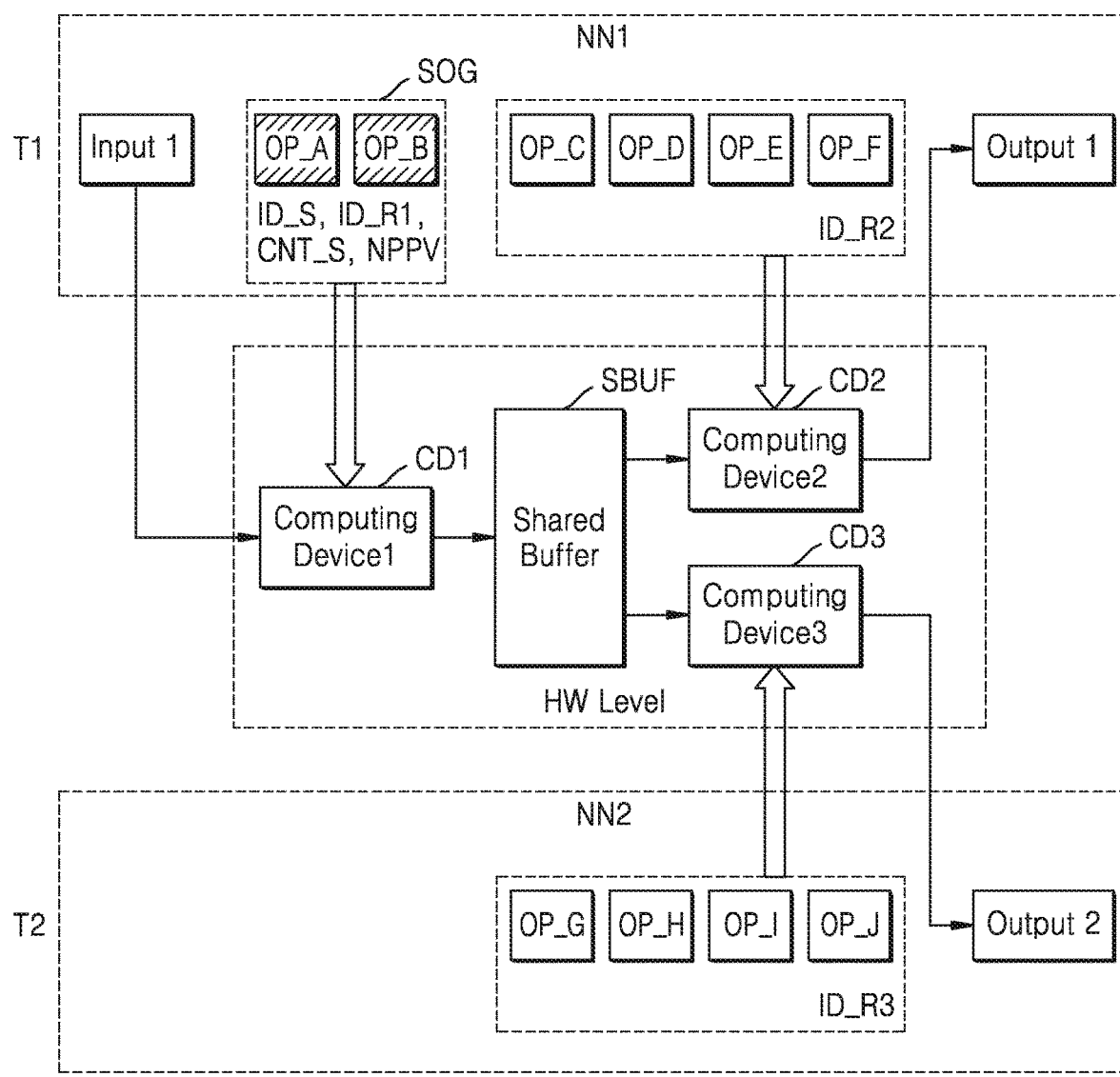

Referring to FIG. 7D, when the neural networks are merged and the computing resources are assigned, a shared ID ID_S, a shared count CNT_S, a resource ID ID_R1, and a non-preemptive value NPPV may be set with respect to the shared operation group SOG. Also, resource IDs ID_R2 and ID_R3 may be set with respect to other operations of the first neural network NN1 and the second neural network NN2. In FIG. 7D, the resource ID ID_R1 with respect to the shared operation group SOG, the resource ID ID_R2 with respect to following operations of the first neural network NN1, and the resource ID ID_R3 with respect to following operations of the second neural networks NN2 may be identical to or different from one another. For example, the execution of the shared operation group (SOG) may be assigned to the computing device in which the following operations of the first neural network NN1 and/or the second neural network NN2 are computed, or may be assigned to another computing device. Further, the following operations of the first neural network NN1 and the following operations of the second neural network NN2 may be assigned to the same computing device or a different computing device. However, for convenience of explanation, it is assumed that the resource ID ID_R1 with respect to the shared operation group SOG, the resource ID ID_R2 with respect to the following operations of the first neural network NN1, and the resource ID ID_R3 with respect to the following operations of the second neural networks NN2 are different from one another. The resource ID ID_R1 with respect to the shared operation group SOG, the resource ID ID_R2 with respect to the following operations of the first neural network NN1, and the resource ID ID_R3 with respect to the following operations of the second neural networks NN1 may correspond to the first computing device CD1, the second computing device CD2 and the third computing device CD3, respectively.

The operations of the first neural network NN1 and the second neural network NN2 may be computed at a hardware level, that is, in computing devices. The shared operation group SOG may be computed, based on the resource ID ID_R1, in a first computing device CD1. An operation result of the shared operation group SOG may be stored in the shared buffer SBUF. When the operation result of the shared operation group SOG is stored in the shared buffer SBUF, a shared buffer ready signal may be generated.

A second computing device CD2 and a third computing device CD3, to which following operations of the first neural network NN1 and the second neural network NN2 are respectively assigned, when the shared buffer ready signal is generated, may receive the operation result of the shared operation group SOG from the shared buffer SBUF, and may compute the assigned operations, based on the operation result. The second computing device CD2 and the third computing device CD3 may compute operations simultaneously or at different same times.

FIGS. 8A through 8D are diagrams showing neural network merge and neural network execution according to at least one example embodiment of the inventive concepts. The neural network merge and the neural network execution in FIGS. 8A through 8D are similar to the neural network merge and the neural network execution in the FIGS. 7A through 7D. However, in FIGS. 8A through 8D, a case in which the inputs of the neural networks are different may be described.

Figure 8A:
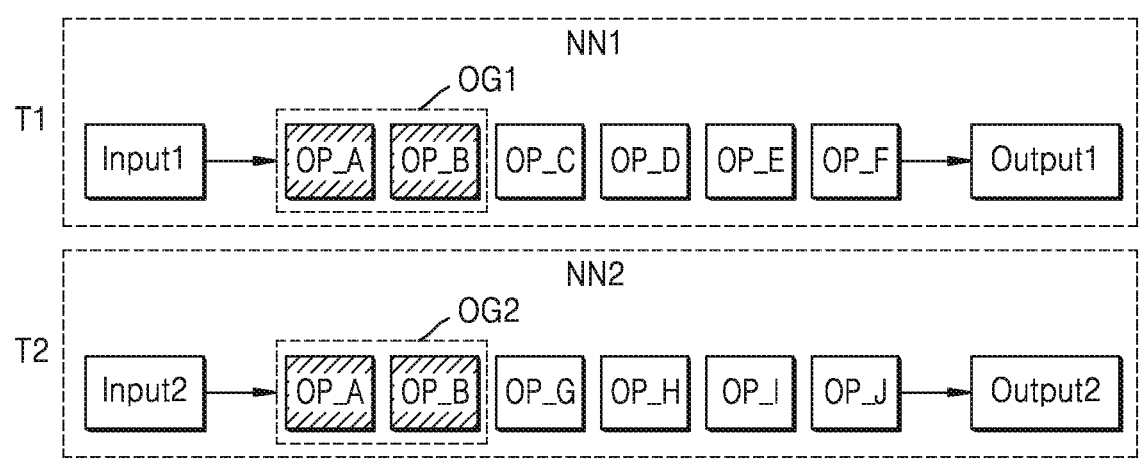
FIGS. 8A through 8D are diagrams showing neural network merge and neural network execution according to at least one example embodiment of the inventive concepts.

Referring to FIG. 8A, a first operation group OG1 of a first neural network NN1 in which a first task T1 is performed and a second operation group OG2 of a second neural network NN2 in which a second task T2 is performed may include same operations OP_A and OP_B. However, an input of the first task T1 may be different from an input of the second task T2.

Figure 8B:
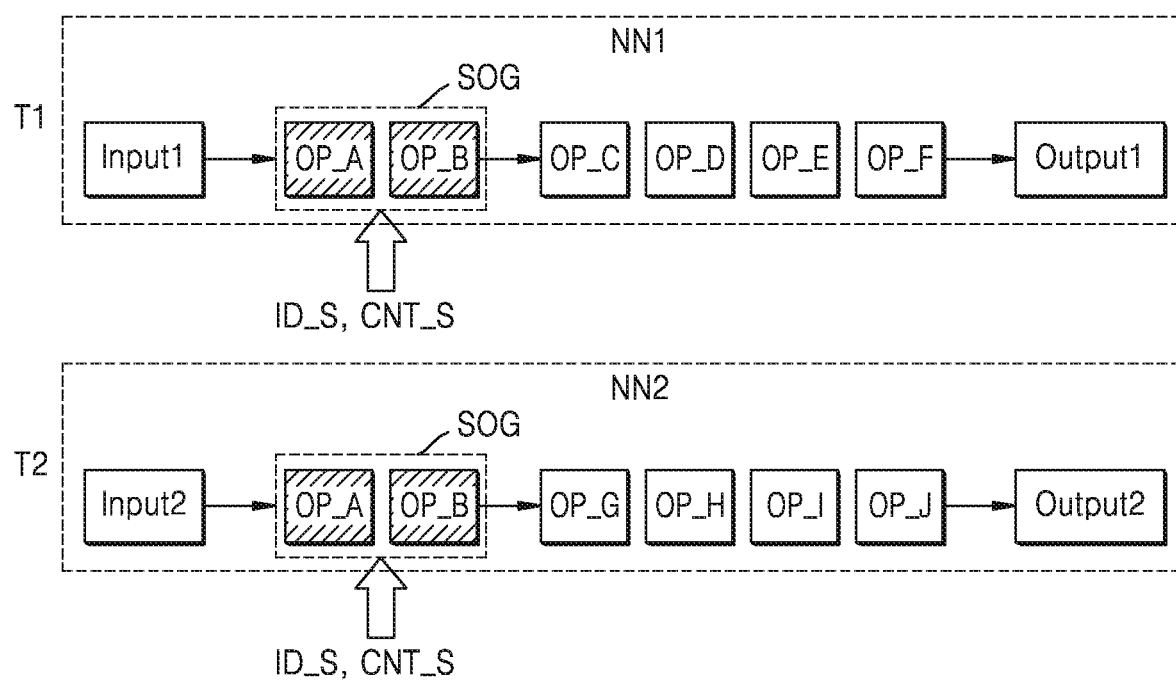

Referring to FIG. 8B, the first operation group OG1 of the first neural network group NN1 and the second operation group OG2 of the second neural network NN2 may be merged as a shared operation group SOG. As described with reference to FIG. 8B, a shared ID ID_S and a shared count CNT_S may be set with respect to each of the first operation group OG1 of the first neural network NN1 and the second operation group OG2 of the second neural network NN2. Outputs of the shared operation groups SOG having the shared ID ID_S may be set as shared buffers between processors, and inputs of following operations OP_C and OP_G of the first neural network NN1 and the second neural network NN2 may also be set as shared buffers. Unlike in FIG. 7B, the shared operation groups SOGs of the first neural network NN1 and the second neural network NN2 are not eliminated.

Figure 8C:
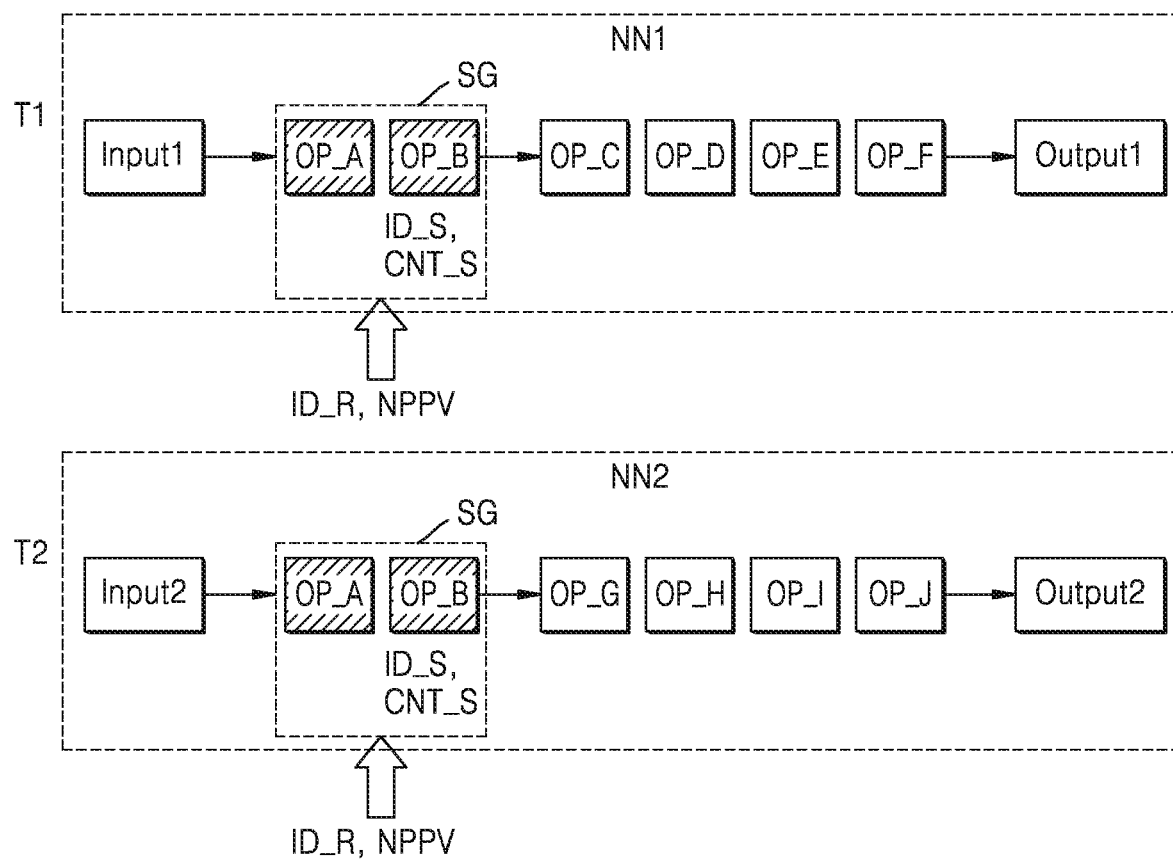

Referring to FIG. 8C, a resource ID ID_R may be set for the shared operation group SOG, which is the merged operation group, and a non-preemptive value NPPV may be additionally set for the shared operation group SOG.

Figure 8D:
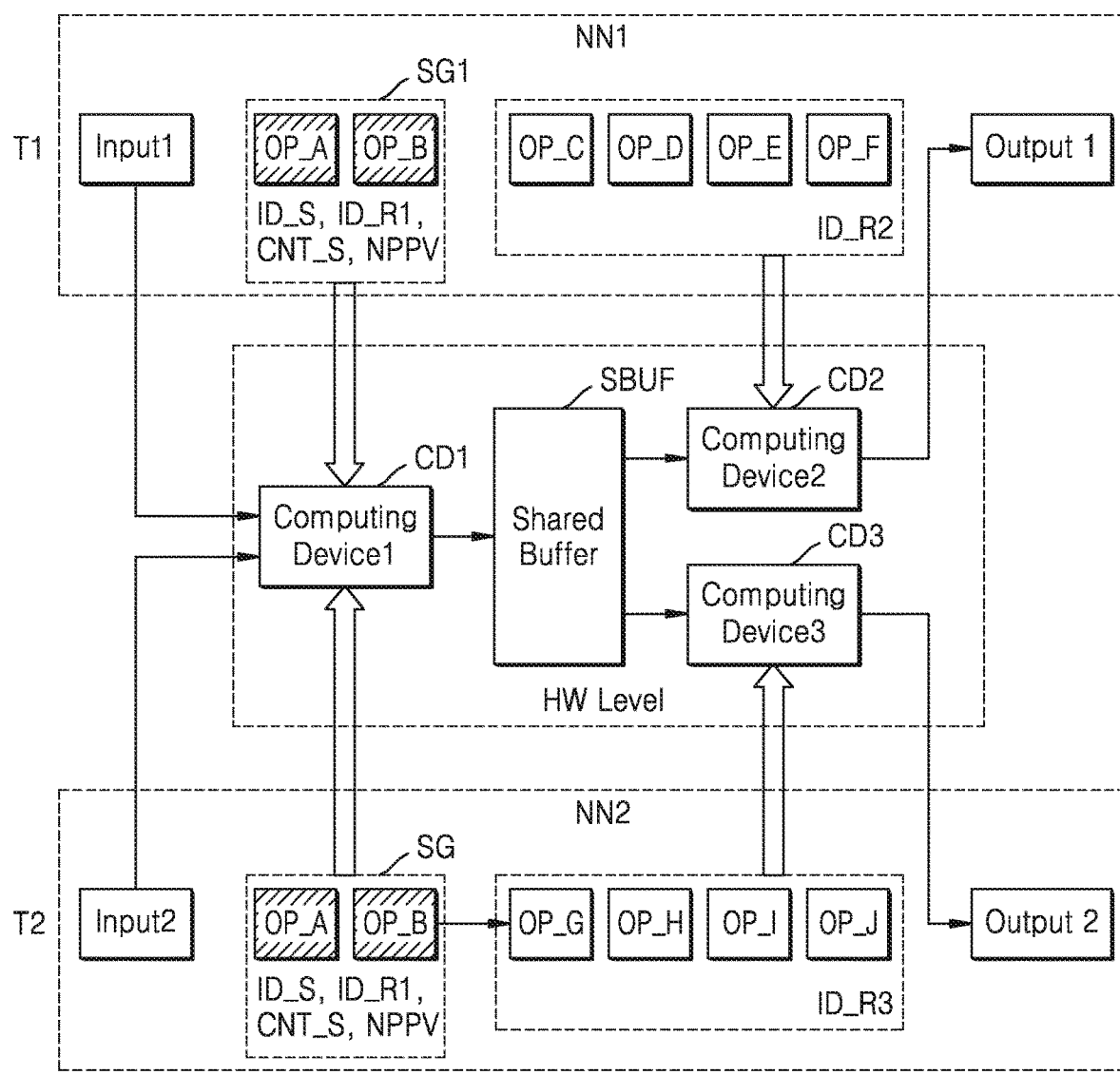

Referring to FIG. 8D, when the neural networks are merged and the computing resources are assigned, a shared ID ID_S, a shared count CNT_S, a resource ID ID_R1, and a non-preemptive value NPPV may be set for the shared operation group SOG. Also, resource IDs ID_R2 and ID_R3 may be set with respect to other operations of the first neural network NN1 and the second neural network NN2. It is assumed that the resource ID ID_R1 with respect to the shared operation group SOG, the resource ID ID_R2 with respect to the following operations of the first neural network NN1, and the resource ID ID_R3 with respect to the following operations of the second neural network NN2 are different from one another.

The shared operation group SOG may be computed, based on the resource ID ID_R1, in a first computing device CD1. An operation result of the shared operation group SOG may be stored in the shared buffer SBUF. Meanwhile as the first input Input 1 of the first neural network NN1 is different from a second input Input 2 of the second neural network NN2, the first computing device CD1 may compute an operation of the shared operation group SOG with respect to the two different inputs. As the operation of the shared operation group SOG with respect to the first input Input 1 and the second input Input 2 is computed in one same computing device, that is, the first computing device CD1, the operation parameters such as bias values, weight values may be loaded in a memory corresponding to single computing device, and accordingly, the memory use may decrease.

When operation execution of the shared operation group SOG based on the first input Input 1 and the second input Input 2 is finished, a shared buffer ready signal may be generated. The second computing device CD2 and the third computing device CD3, to which the following operations of the first neural network NN1 and the second neural network NN2 are respectively assigned, may receive the operation results of the shared operation group SOG from the shared buffer SBUF in response to the shared buffer ready signal, and based on the received operation results, may compute the assigned operations.

The neural network merge and the neural network execution according to at least one example embodiment of the inventive concepts have been described with reference to FIGS. 7A through 8D. In FIGS. 7A through 8D, a case in which the shared operation group, which are common operation groups of the first neural network NN1 and the second neural network NN2 are arranged in a primitive of the neural networks NN1 and NN2. However, at least some example embodiments of the inventive concepts are not limited thereto, and According to at least one example embodiment of the inventive concepts, the shared operation group may also be arranged at ends or sublevels of the first neural network NN1 and/or the second neural network NN2. In this case, as the inputs of the shared operation group may be different from one another, the neural network merge and the neural network execution may be performed in a way similar to what is described with reference to FIGS. 8A through 8D.

Figure 9:
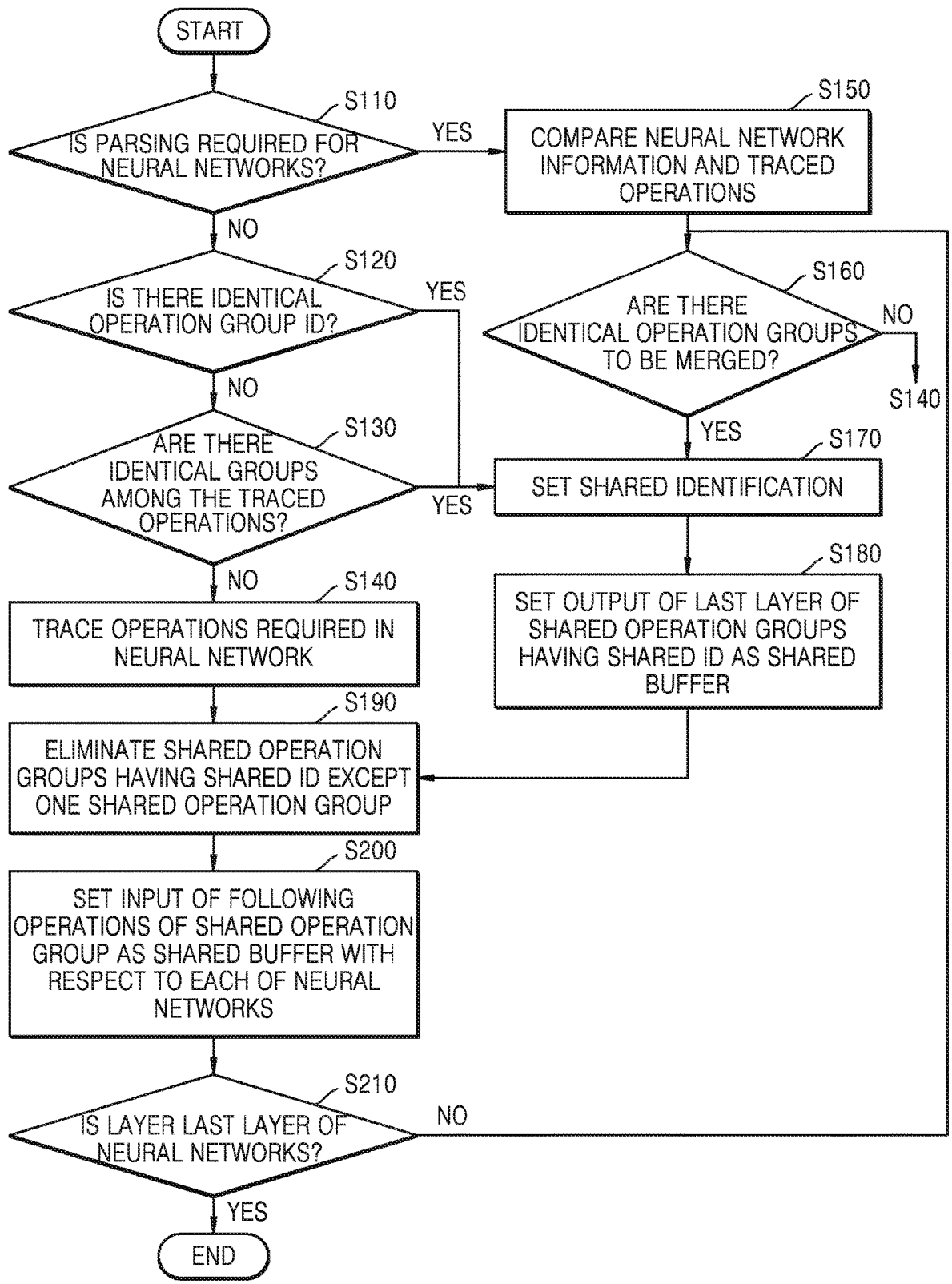
FIG. 9 is a flowchart showing an example of a method of merging neural networks according to at least one example embodiment of the inventive concepts.

FIG. 9 is a flowchart showing an example of a method of merging the neural networks according to at least one example embodiment of the inventive concepts. A method of merging the neural networks may be implemented in the neural network merger 231 in FIG. 5. Accordingly, descriptions with reference to FIG. 5 may also be applied to the example method illustrated in FIG. 9.

Referring to FIG. 9, when the information about the neural networks to perform tasks is received, the neural network merger 231 may determine whether neural network parsing is needed to merge the neural networks (S110). When the neural network information includes pre-defined IDs, for example, IDs of the sub neural networks, and the IDs of the operation groups, the neural network merger 231 may determine that the neural network parsing is not needed.

When the neural network parsing is not needed, the neural network merger 231 may determine whether there is an identical operation group ID among the identical neural networks, based on the neural network information (S120).

When there is an identical operation group ID, the neural network merger 231 may set a shared ID with respect to the identical operation group included in the neural networks, that is, a common operation group (S170).

On the other hand, when there is no identical operation group ID, the neural network merger 231 may determine whether there is an identical operation group, based on the operation history of the neural networks (S130). During the runtime of the neural networks, an operation process may be traced, and accordingly, an operation history may be generated. The neural network merger 231 may trace the operation process during the runtime by executing the neural networks, and may determine whether there are identical operation groups, based on the operation history.

When there are identical operation groups, the neural network merger 231 may set a shared ID with respect to the identical operation groups (S170). After determination based on the operation history, when there are no identical operation groups, the neural network merger 231 may continue tracing operations required in the neural networks, that is, operation processes included in respective layers of the neural networks (S140). Accordingly, operation histories may be continually generated during the runtime.

When the neural network parsing is required, the neural network merger 231 may compare information or traced operations, that is, the operation histories (S150). For example, the neural network merger 231 may compare layer topologies of the neural networks or the operation histories of the neural networks.

As a result of the comparison, the neural network merger 231 may determine whether there are identical operation groups, that is, operation groups to be merged between the neural networks (S160). When it is determined that there are identical operation groups, that is, the operation groups to be merged, the neural network merger 231 may set a shared ID with respect to the identical operation groups (S170). When it is determined that there are no identical operation groups, in the operation of S140, the neural network merger 231 may continue tracing operations required in the neural networks, in the neural network. Like this, by using various methods, the identical operation groups may be detected among the neural networks.

After the shared ID is set for the identical operation groups, the neural network merger 231 may set outputs of a last layer of the shared operation groups having the shared ID ID_S as a shared buffer (S180). Thereafter, in the operation of S140, the neural network merger 231 may continue tracing operations required in the neural networks, in the neural network.

The shared operation groups having the shared ID, except one shared operation group, may be eliminated (S190). For example, when the first neural network, the second neural network, and the third neural network respectively include the shared operation groups, the shared operation groups in the second and the third neural networks, except the shared operation group in the first neural network, may be eliminated.

Also, with respect to each of the neural networks, inputs of following operations of the shared operation group may be set as the shared buffer (S200). According to at least one example embodiment of the inventive concepts, the operation of S190 may be performed before the operation of S200 or may be performed simultaneously with the operation of S200. Next, the neural network merger 231 determines whether the aforementioned operations are performed with respect to the last layer of the neural networks (S210). For example, the neural network merger 231 may determine whether there are identical operation groups for all layers of neural networks and whether the identical operation groups are merged. When it is determined that the operations are performed with respect to the last layer of the neural networks, the neural network merge may be finished. When it is determined that the operation is not performed with respect to the last layer of the neural network, the neural network merger 231 may confirm whether there are identical operation groups to be merged between the neural networks for the other layers, according to the aforementioned operations.

Figure 10:
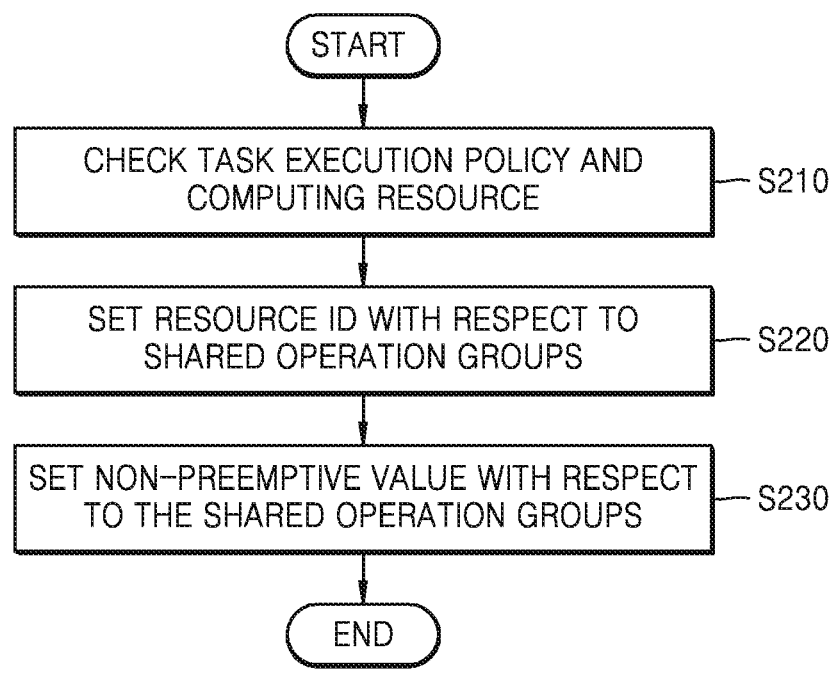
FIG. 10 is a flowchart showing an example of a method of assigning computing resources with respect to merged neural networks according to at least one example embodiment of the inventive concepts.

FIG. 10 is a flowchart showing an example of a method of assigning computing resources with respect to merged neural networks according to at least one example embodiment of the inventive concepts. As described with reference to FIG. 9, the method of assigning the computing resources in FIG. 10, when the identical operation groups between the neural networks are merged, may be performed in the neural network assignor 232 in FIG. 5. Accordingly, descriptions with reference to FIG. 5 may also be applied to the example method illustrated in FIG. 10.

Referring to FIG. 10, the neural network assignor 232 may check a task execution policy and the computing resources (S210). As described with reference to FIG. 5, from the static information and the dynamic information provided by the context manager 240 and the computing resource manager, the computer resource, and preferred information of the applications (e.g., information indicating preferences of the applications), that is, the task execution policy, may be confirmed.

Based on the task execution policy and the computing resources, the neural network assignor 232 may set a resource ID with respect to the shared operation group (S220). Based on the task execution policy and the computing resources (e.g., amounts of available processing resources of the computing devices 260), the neural network assignor 232 may select a processor to compute the shared operation group from among the plurality of processors of the computing devices, and may assign the resource ID to the processor with respect to the shared operation group. According to at least one example embodiment of the inventive concepts, when the resource IDs are set, the neural network assignor 232 may assign the resource IDs in consideration of the shared count CNT_S. Next, a non-preemptive value may be set with respect to the shared operation group so that the shared operation group may have a priority with respect to the assigned processor (S230).

Figure 11:
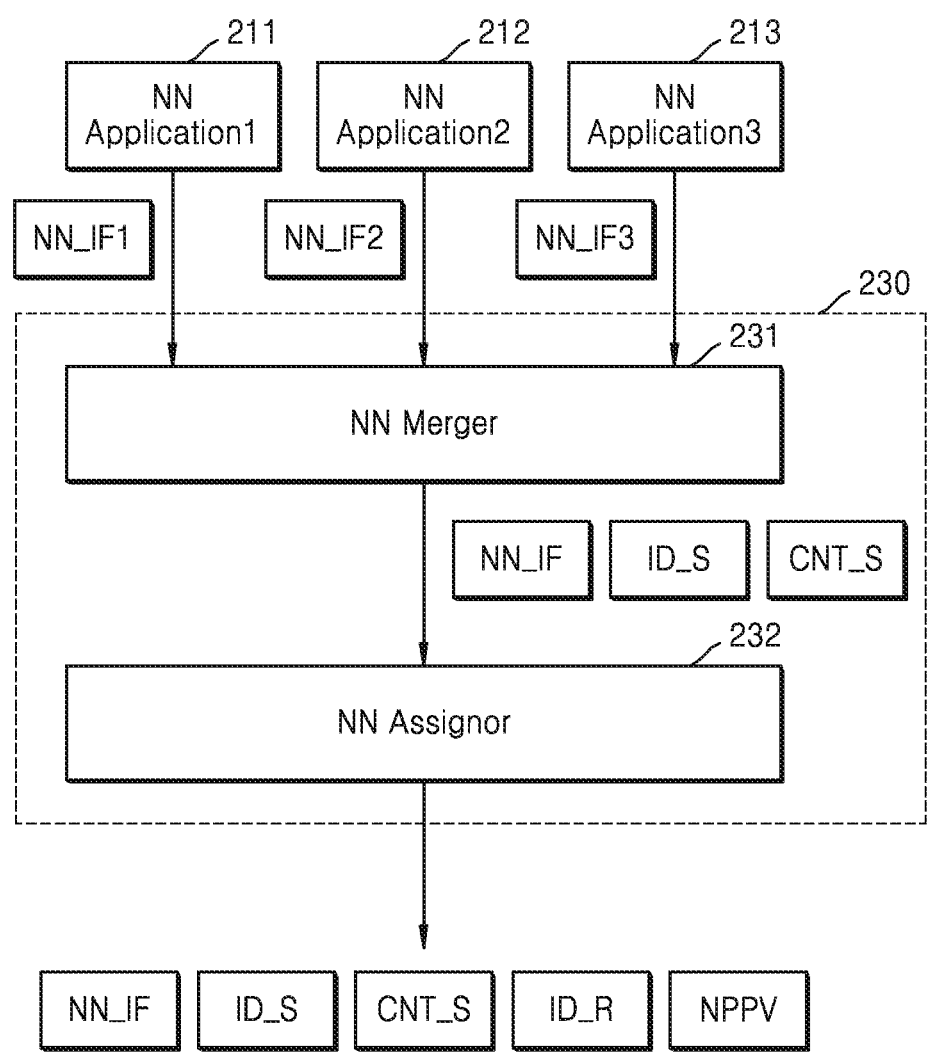
FIG. 11 is a block diagram showing a data flow of the neural network merge module according to at least one example embodiment of the inventive concepts.

FIG. 11 is a block diagram showing data flows of the neural network merge module according to at least one example embodiment of the inventive concepts.

Referring to FIG. 11, neural network information NN_IF1, NN_IF2, and NN_IF3 about each of the neural networks to perform the issued from the plurality of applications 211, 212, and 213 may be provided to the neural network merger 231. The information, for example, may be provided by the deep learning framework (see 220 in FIG. 5).

As described above, the neural network merger 231 may search for the shared operation groups of the neural networks and merge the shared operation groups. Accordingly, a shared ID ID_S and a shared count CNT_S, which are assigned to the shared operation group, may be added to neural work information NN_IF regarding the plurality of neural networks.

The neural network assignor 232 may assign a resource ID ID_R and a non-preemptive value NPPV to the shared operation group. Accordingly, the shared ID ID_S, the shared count CNT_S, the resource ID ID_R, and the non-preemptive value NPPV may be added to the neural network information NN_IF.

Figure 12:
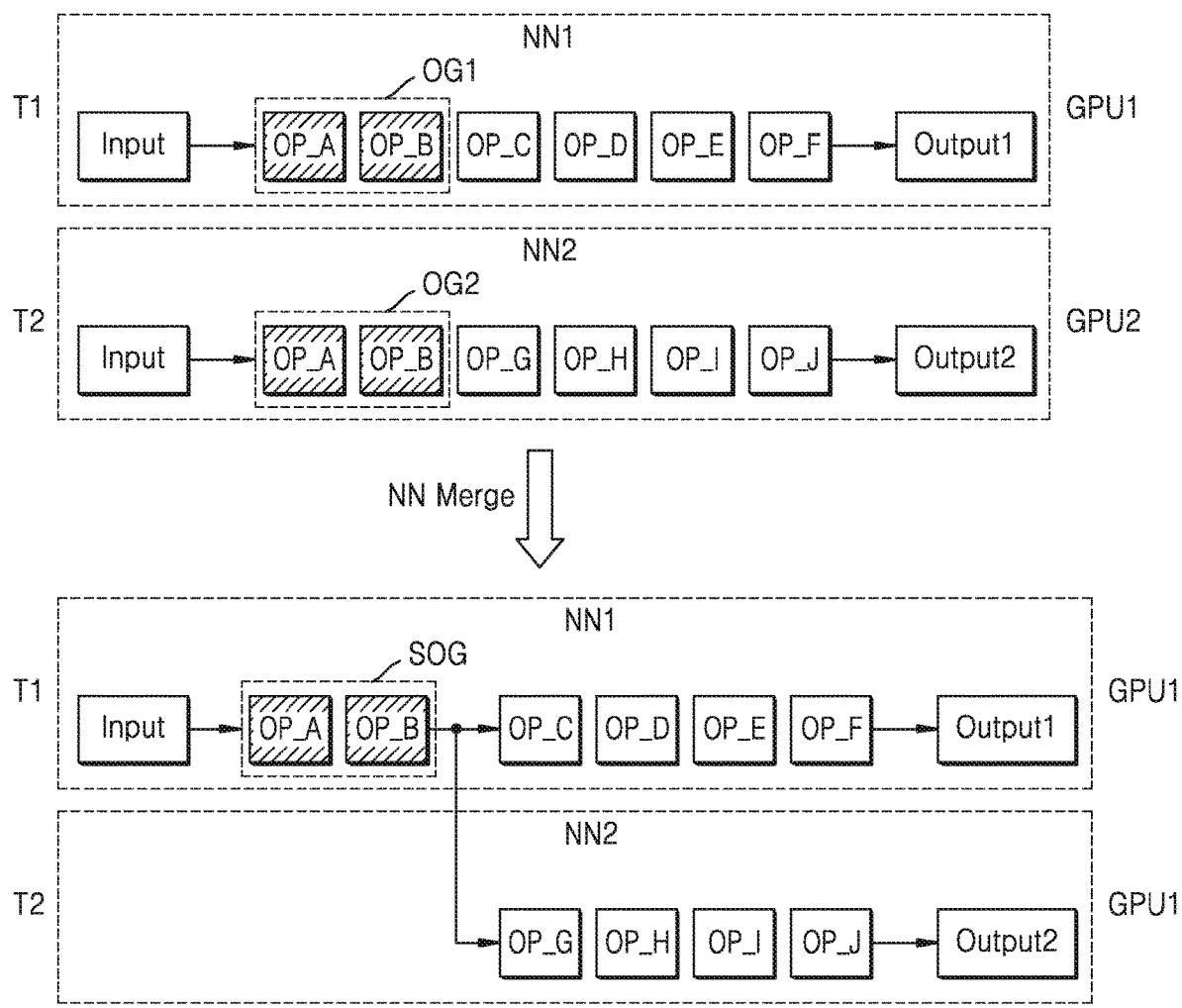
FIGS. 12 through 14 are diagrams showing neural network merges according to at least one example embodiment of the inventive concepts.
Figure 13:
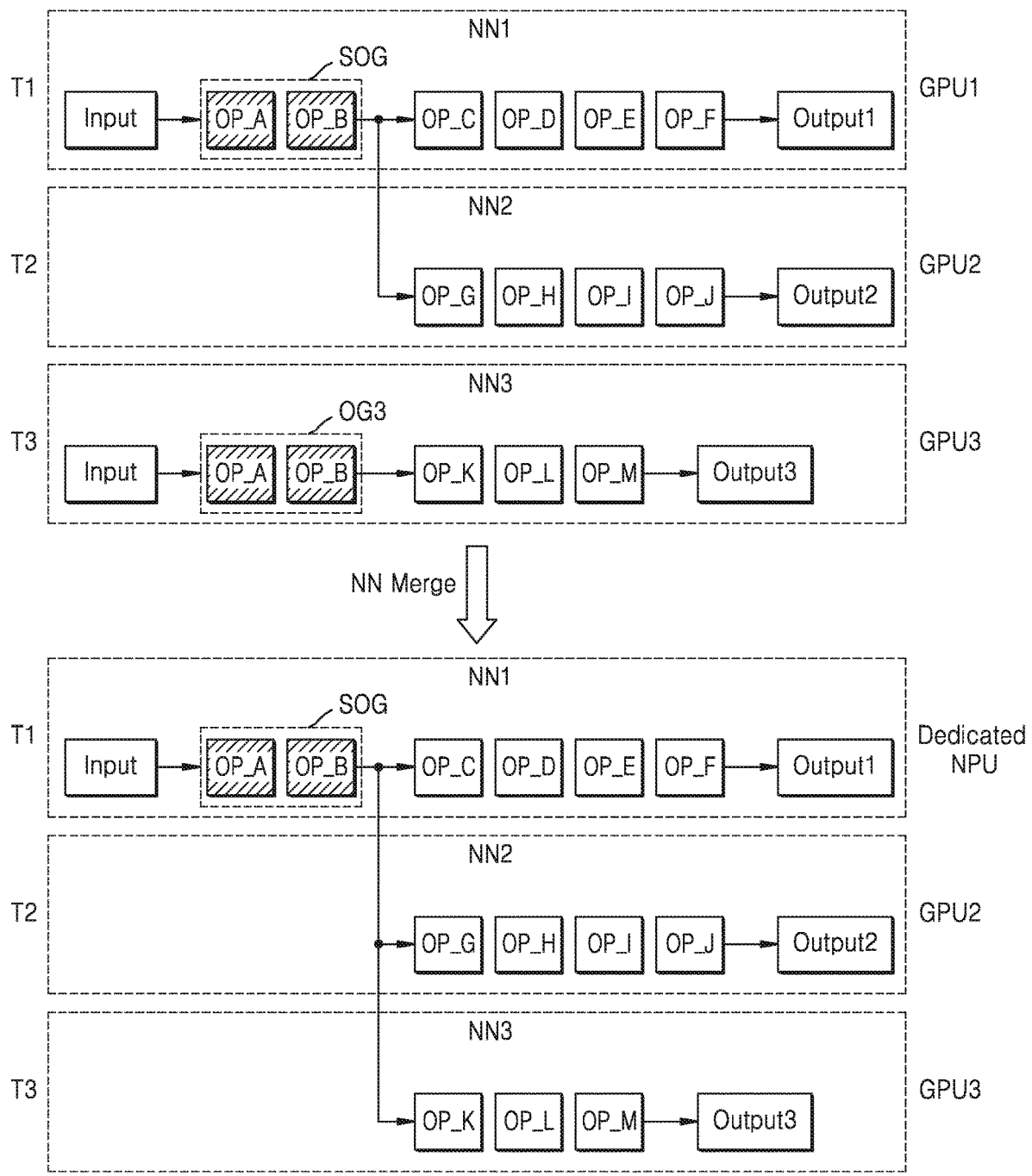
Figure 14:
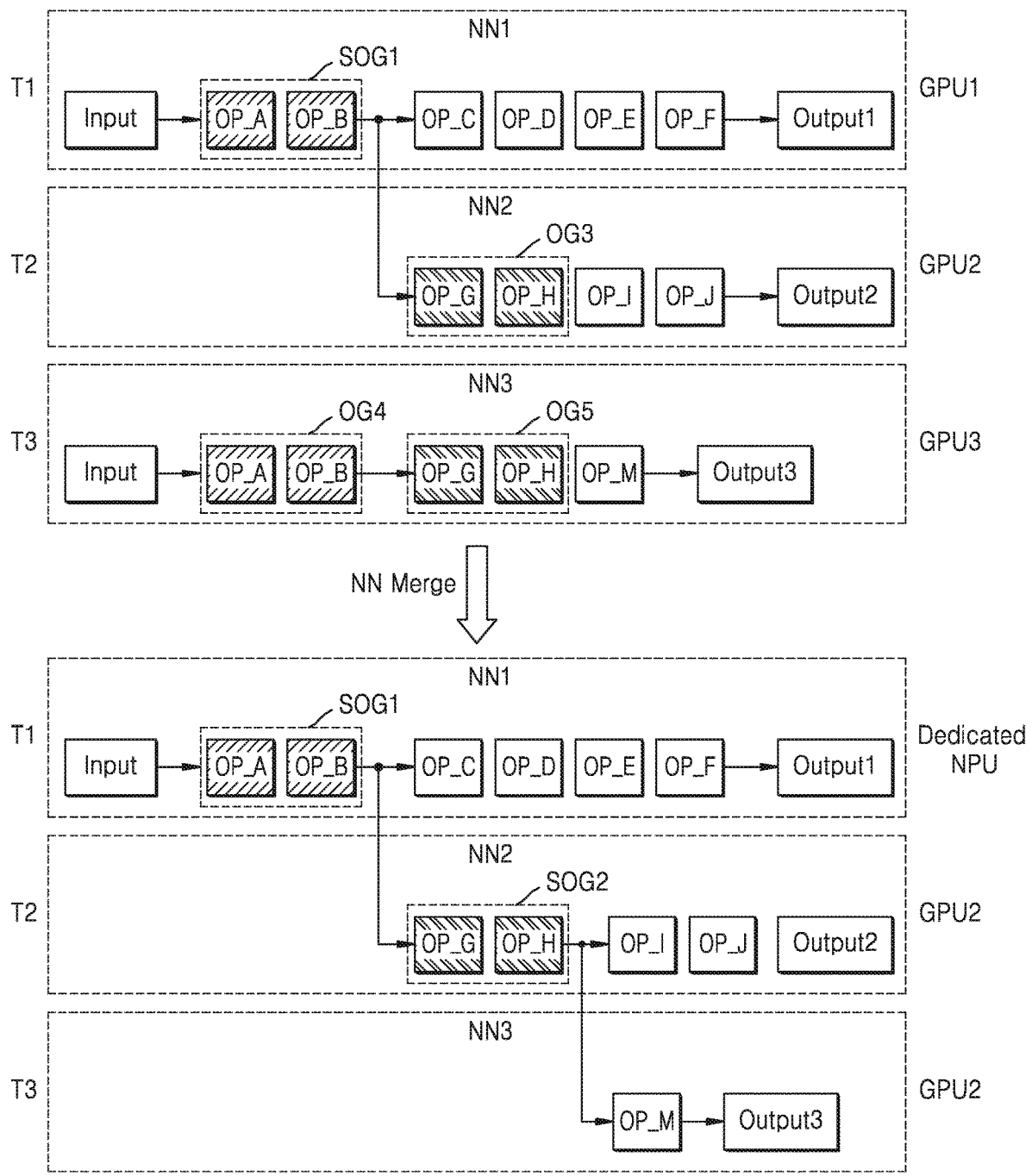

FIGS. 12 through 14 are diagrams showing the neural network merges according to at least one example embodiment of the inventive concepts.

Referring to FIG. 12, a first task T1 and a second task T2 may be performed respectively in the first neural network NN1 and the second neural network NN2, and operations and orders of operation execution are identical in a first operation group OG1 of the first neural network NN1 and in the second operation group OG2 of the second neural network NN2.

With respect to the first neural network NN1 and the second neural network NN2, when the common operation groups, that is, the first operation group OG1 and the second operation group OG2, are not merged, the first neural network NN1 and the second neural network NN2 may be executed respectively in GPU1 and GPU2. The first operation group OG1 and the second operation group OG2 may also be computed respectively in GPU1 and GPU2.

However, as illustrated, as the first operation group OG1 and the second operation group OG2 are merged into the shared operation group SOG, redundant computing of the first operation group OG1 and the second operation group OG2 may be prevented. Accordingly, amounts of computing of the first neural network NN1 and the second neural network NN2 decrease, and the first neural network NN1 and the second neural network NN2 may be executed in single processor, that is, GPU1.

Referring to FIG. 13, in a process where the first task T1 and the second task T2 are respectively performed in the first neural network NN1 and the second neural network NN2, and operation groups included in common in the first neural network NN1 and the second neural network NN2 are merged into the shared operation group SOG and computed (for example, during the runtime of the first neural network NN1 and the second neural network NN2), a third task T3 may be issued. The third task T3 may be performed in a third neural network NN3, and a third operation group OG3 of the third neural network NN3 may be identical to the shared operation group SOG.

Accordingly, the third operation group OG3 of the third neural network NN3 may be merged to the shared operation group SOG. When the third operation group OG3 of the third neural network NN3 is not merged to the shared operation group SOG, the resource ID of GPU1 may be assigned to the shared operation group SOG. In other words, operations of the shared operation group SOG may be computed in GPU1. As the third operation group OG3 of the third neural network NN3 is merged to the shared operation group SOG, the shared count of the shared operation group SOG may increase. For example, the shared count may increase from '2' to '3'. When a certain threshold value is set as '3', the resource ID of the dedicated NPU may be assigned to the shared operation group SOG, and the shared operation group SOG may be computed in the dedicated NPU. In FIG. 13, following operations after the shared operation group SOG among the operations of the first neural network NN1 are computed in the dedicated NPU, but at least some example embodiments of the inventive concepts is not limited thereto. The following operations may be computed in other computing devices.

Referring to FIG. 14, like as shown in FIG. 13, in a process where the operation groups included in common in the first neural network NN1 and the second neural network NN2 are merged into a first shared operation group SOG1 and computed (for example, during runtime of the first neural network NN1 and the second neural network NN2), the third task T3, which is performed in the third neural network NN3, may be issued. A fourth operation group OG4 and a fifth operation group OG5 of the third neural network NN3 may respectively be identical to the first shared operation group SOG1 and the third operation group OG3 in the second neural network NN2.

Accordingly, the fourth operation group OG4 of the third neural network NN3 may be merged to the first shared operation group SOG1, and the third operation group OG3 of the second neural network NN2 and the fifth operation group OG5 of the third neural network NN3 may be merged into a second shared operation group SOG2.

When the fourth operation group OG4 and the fifth operation group OG5 are not respectively merged to the first shared operation group SOG1 and the third operation group OG3 of the second neural network NN2, resources IDS of GPU1, GPU2, GPU3 may respectively be assigned to the first neural network NN1, the second neural network NN2, and the third neural network NN3, and the resource ID of GPU1 may be assigned to the first shared operation group SOG1. However, as the operation groups are merged, the shared count of the first shared operation group SOG1 increases, and operations with respect to the first neural network NN1, the second neural network NN2, and the third neural network NN3 decrease. Accordingly, the resource ID of the dedicated NPU may be assigned with respect to the first shared operation group SOG1 and following operations after the first shared operation group of the first neural network NN1, and the resource ID of the GPU2 may be assigned with respect to the second neural network NN2 and the third neural network NN3.

Figure 15:
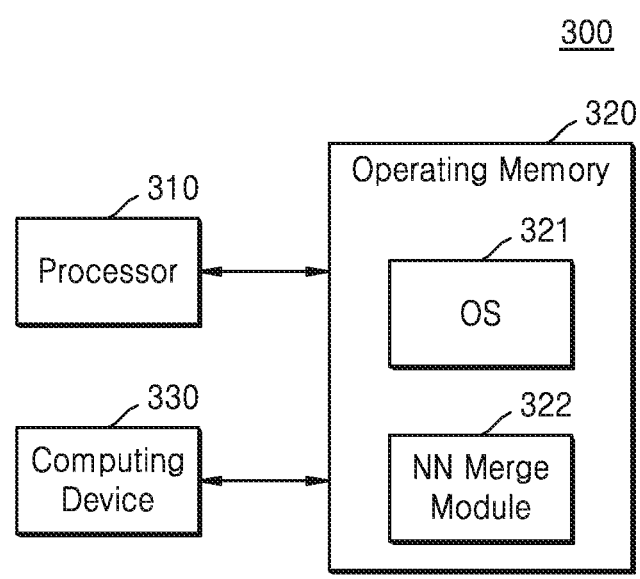
FIG. 15 is a block diagram showing an example in which a neural network merge module, according to at least one example embodiment of the inventive concepts, is implemented in a software.

FIG. 15 is a block diagram showing an example in which a neural network merge module, according to at least one example embodiment of the inventive concepts, is implemented in a software. A system illustrated in FIG. 15 may be an application processor 300, which is a semiconductor chip that may be implemented as a system on chip (SoC).

The application processor 300 may include a processor 310, an operating memory 320 and a computing device 330. The computing device 330 may include a plurality of hardware devices, that is, computing processors. Although not illustrated in FIG. 15, the application processor 300 may further include more than one intellectual property (IP) modules connected to a system bus. The operating memory 320 may store software such as various programs and instructions related to operations of the system by which the application processor 300 is adopted, and for example, may include an operation system 321, and a neural network merge module 322. According to at least one example embodiment of the inventive concepts, the neural network merge module 322 may also be implemented in the operation system 321.

The neural network merge module 322, by merging the operation groups or the sub neural networks included in common in the plurality of neural networks, and assigning a shared ID and a resource ID to the merged operation group or the merged sub neural network, may set the operation groups or the sub neural networks merged in the process of executing the plurality of neural networks may be executed in single operation processor.

Figure 16:
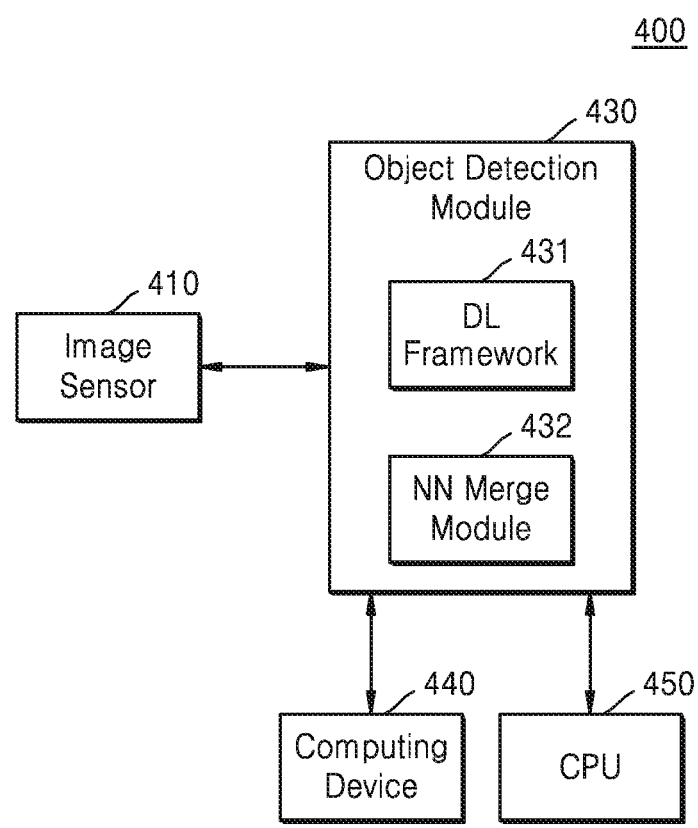
FIGS. 16 and 17 are block diagrams respectively illustrating embodiments of the neural network system including the neural network merge module according to at least one example embodiment of the inventive concepts.
Figure 17:
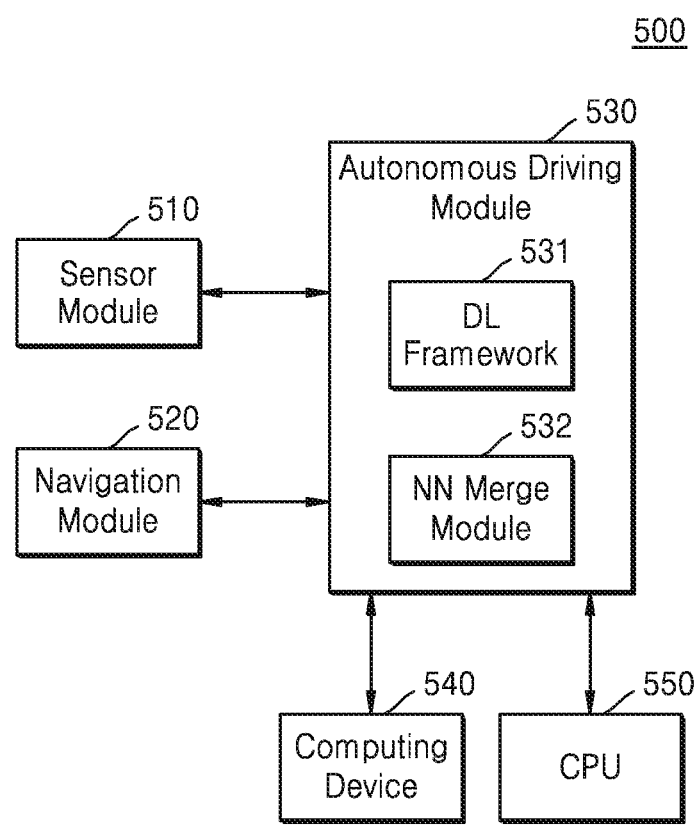

FIGS. 16 and 17 are block diagrams respectively illustrating an example of the neural network system including the neural network merge module according to at least one example embodiment of the inventive concepts. FIG. 16 is a block diagram showing an object detection module 430, and FIG. 17 is a block diagram showing an autonomous driving module 530.

Referring to FIG. 16, the object detection system 400, such as an image process system, may include an object detection module 430, an image sensor 410, a computing device 440, and a CPU 450, and the object detection module 430 may include a deep learning framework 431 and a neural network merge module 432. The object detection module 430 is executed under control of the CPU, may detect an object from an image received from the image sensor 410, and may generate an information signal. The object detection module 430 may compute a plurality of neural networks, and the neural network merge module may merge operation groups or sub neural networks included in common in the neural networks, and may assign a shared ID and a resource ID to the merged operation group or merged sub neural networks. The merged operation group or merged sub neural networks having same shared ID or same resource ID may computed once in a computing device.

Referring to FIG. 17, the autonomous driving system 500 may include a sensor module 510, a navigation module 520, an autonomous driving module 530, a computing device 540, and a CPU 550. The autonomous driving module 530 may also include a deep learning framework 531 and a neural network merge module 532. The autonomous driving module 530 may perform neural network operations by using image information and voice information received from the sensor module 510 and the navigation module 520, and may generate information signals such as an image detection result and a voice detection result, based on the result of performance. For example, the sensor module 510 may include devices such as a camera or a microphone, which may collect various image information and voice information, and may provide the collected information to the autonomous driving module 530. The navigation module 520 may also provide various information regarding vehicle driving (for example, positional information), to the autonomous driving module 530. The autonomous driving module 530, having the information from the sensor module 510 and/or the navigation module 520 as an input, may execute various types of neural networks, thereby generating information signals. The neural network merge module 432 may merge the common operation groups or common sub neural networks in the plurality of neural networks, and may assign a shared ID and a resource ID to the merged operation groups or the sub neural networks. The merged operation group or merged sub neural networks having same shared ID or same resource ID may computed once in a computing device.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A method of operating a neural network system, the method comprising:
    analyzing a layer topology of at least one of a first neural network and a second neural network, and obtaining a first operation group in the first neural network and a second operation group in the second neural network, based on a result from the analyzing;
    merging, by a processor, the first operation group in the first neural network and the second operation group in the second neural network, including identical operations, as a shared operation group,
        the merging including changing operation parameters of second operations in the second neural network to be identical to operation parameters of first operations in the first neural network, based on the result from the analyzing that the first operations in the first neural network and the second operations in the second neural network have identical operation topologies and different operation parameters;
    selecting, by the processor, a first hardware to execute the shared operation group, from among a plurality of hardware; and
    executing the shared operation group by using the first hardware.

2. The method of claim 1, wherein the merging of the first operation group and the second operation group comprises:
    obtaining the first operation group and the second operation group from among a plurality of operations in the first neural network and a plurality of operations in the second neural network, respectively; and assigning, to the first operation group and the second operation group, a shared identification (ID) indicating the shared operation group.

3. The method of claim 2, wherein the obtaining of the first operation group and the second operation group comprises:
obtaining the first operation group and the second operation group, based on at least one of,
operation group IDs, or
a sub neural network ID set for each of the first neural network and the second neural network.

4. The method of claim 2, wherein the obtaining of the first operation group and the second operation group comprises:
generating an operation history by tracing an operation process of at least one of the first neural network and the second neural network during runtime of at least one of the first neural network and the second neural network, and obtaining the first operation group and the second operation group, based on the operation history.

5. The method of claim 1, wherein the executing of the shared operation group comprises:
storing, by the first hardware, an output of a last operation of the shared operation group in a shared buffer,
the shared buffer being shared between a second hardware and a third hardware,
the second hardware being a hardware to which operations of the first neural network that follow the first operation group are assigned,
the third hardware being a hardware to which operations of the second neural network that follow the second operation group are assigned,
the second hardware and the third hardware being separate hardware with respect to each other.

6. The method of claim 5, further comprising:
accessing, by the second hardware, the shared buffer in response to a shared buffer ready signal;
executing, by the second hardware, operations of the first neural network that follow the first operation group;
accessing, by the third hardware, the shared buffer in response to a shared buffer ready signal; and
executing, by the third hardware, operations of the second neural network that follow the second operation group.

7. The method of claim 2, wherein the assigning of the shared ID comprises:
assigning, to the first operation group and the second operation group, a shared count indicating a number of operation groups having the shared ID.

8. The method of claim 7, wherein the selecting of the first hardware comprises:
selecting the first hardware based on at least one of preferred information of applications, amounts of available processing resources, or the shared count; and
assigning a resource ID of the first hardware to the shared operation group.

9. The method of claim 8, wherein the selecting of the first hardware comprises:
setting a priority with respect to the shared operation group, such that the first hardware executes the shared operation group prior to other operations.

10. The method of claim 1, wherein the merging of the first operation group and the second operation group and the selecting of the first hardware are performed during runtime of at least one of the first neural network and the second neural network.

11. An application processor, comprising:
a memory storing programs;
a processor configured to execute the programs stored in the memory; and
a neural network merge module comprising programs loadable in the memory, wherein the processor is further configured to, by executing the neural network merge module, identify common sub neural networks included in a plurality of neural networks performing different tasks,
analyze a layer topology of at least one of the common sub neural networks, and obtain a first operation group in the first one of the common sub neural networks and a second operation group in a second one of the common sub neural networks, based on a result from the analyzing, and
merge the common sub neural networks included in the plurality of neural networks into a shared sub neural network to be executed by a single process,
the merging including changing operation parameters of second operations in the second one of the common sub neural networks to be identical to operation parameters of first operations in the first one of the common sub neural networks, based on the result from the analyzing that the first operations in the first one of the common sub neural networks and the second operations in the one of the common sub neural networks have identical operation topologies and different operation parameters.

12. The processor of claim 11, wherein the processor is further configured to, by executing the neural network merge module, identify the common sub neural networks, based on sub neural network identifications (IDs) preset with respect to each of a plurality of sub neural networks.

13. The processor of claim 11, wherein the processor is further configured to, by executing the neural network merge module, trace an operation process in runtime with respect to at least one neural network from among the plurality of neural networks, thereby generating an operation history with respect to the at least one neural network.

14. The processor of claim 11, wherein the processor is further configured to, by executing the neural network merge module,
with respect to the shared sub neural network, generate a shared ID, a shared count, and a resource ID indicating hardware by which the shared sub neural network is executed, and add the shared ID, the shared count, and the resource ID to model information regarding the shared sub neural network.

15. A neural network system, comprising:
a plurality of processors; and
a neural network merge module configured to search for an operation group included in common in a plurality of neural networks performing different tasks, and set a shared identification (ID) and a resource ID for an operation group that is found as a result of the searching, thereby setting the found operation group to be computed in one of the plurality of processors during execution of the plurality of neural networks, the neural network merge module including
a merger configured to perform the search fro an operation group included in common in the plurality of neural networks and set the shared ID and a shared count for the found operation group; and
an assignor configured to select a processor to compute the found operation group from among the plurality of processors, based on an execution policy, computing resources, and the shared count, and add the resource ID set for the found operation group to information regarding the plurality of neural networks, the resource ID being an ID indicating the selected processor, and the shared count indicative of a total number of the plurality of neural networks that include the found operation group in common.

16. The neural network system of claim 15, wherein the neural network merge module is further configured to trace operation processes in runtime with respect to at least one neural network from among the plurality of neural networks, thereby generating an operation history with respect to the at least one neural network.

17. The neural network system according to claim 15, wherein the merger is configured to set a priority with respect to the selected processor to the operation group.

* * * * *